United States Patent [19]

Say

[11] Patent Number: 5,335,622
[45] Date of Patent: Aug. 9, 1994

[54] INDICATOR CAP

[76] Inventor: James L. Say, Post Office Box 1418, Frisco, Colo. 80443

[21] Appl. No.: 63,629

[22] Filed: May 18, 1993

Related U.S. Application Data

[63] Continuation-in-part of Ser. No. 796,736, Nov. 25, 1991, abandoned, which is a continuation-in-part of Ser. No. 550,162, Jul. 9, 1990, Pat. No. 5,078,077.

[51] Int. Cl.$^5$ ............................................. G01F 23/00
[52] U.S. Cl. ................................. 116/227; 73/323; 134/113; 222/156
[58] Field of Search ................. 73/290 B, 303, 323; 116/227, DIG. 8; 134/93, 113; 222/154, 156, 651, 652

[56] References Cited

U.S. PATENT DOCUMENTS

| | | | |
|---|---|---|---|
| 1,477,145 | 12/1923 | Marone | 116/227 |
| 3,103,816 | 9/1963 | Kawecki | 73/323 |
| 3,972,234 | 8/1976 | Osojnak | 73/303 |
| 4,141,311 | 2/1979 | Taylor, Jr. | 116/227 |
| 4,164,197 | 8/1979 | Nelson | 116/227 |
| 5,078,077 | 1/1992 | Say | 116/227 |

FOREIGN PATENT DOCUMENTS

| | | | |
|---|---|---|---|
| 679804 | 8/1979 | U.S.S.R. | 116/227 |
| 2082773 | 3/1982 | United Kingdom | 72/323 |

Primary Examiner—William A. Cuchlinski, Jr.
Assistant Examiner—Willie Morris Worth
Attorney, Agent, or Firm—Dominik, Stein, Saccocio, Reese, Colitz & VanDerWall

[57] ABSTRACT

A universal indicator cap for a dishwasher rinse agent dispenser including a reservoir with an opening positioned in door of a dishwasher for indicating a low level of rinse agent in the reservoir, the door being pivotal between an opened horizontal position and a vertical closed position. The indicator cap comprises a body including a head portion having a cavity formed therein and a neck portion, a gasket adaptor positioned about the neck portion such that the indicator cap is adaptable to different models of the rinse agent dispenser, means for vertically mounting the body into the opening in the reservoir with the neck portion extending downwardly into a bottommost area of the reservoir, a first fluid passageway extending through the neck portion from an opened terminal end thereof to the cavity of the head portion, and a visual pump for pumping rinse agent through the first fluid passageway into the cavity to visually indicate the presence of the rinse agent in the cavity. The neck portion may be retractable such that the indicator cap is adaptable to different models of the rinse agent dispenser. The indicator cap functions by allowing air to flow upwardly through the first fluid passageway when the level of rinse agent in the reservoir is below the opened terminal end of the first fluid passageway causing drainage of rinse agent in the cavity to visually indicate a low level condition.

34 Claims, 17 Drawing Sheets

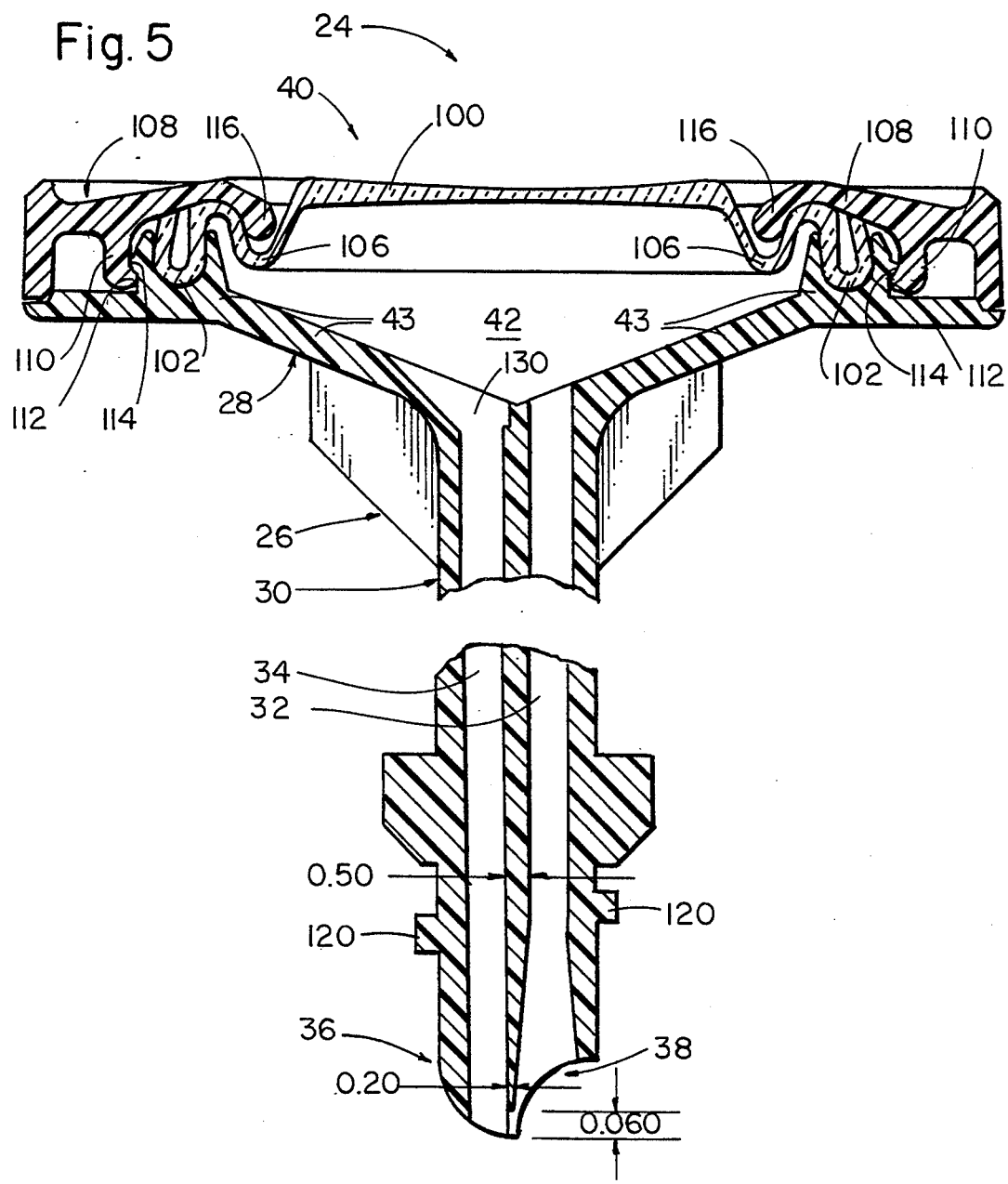

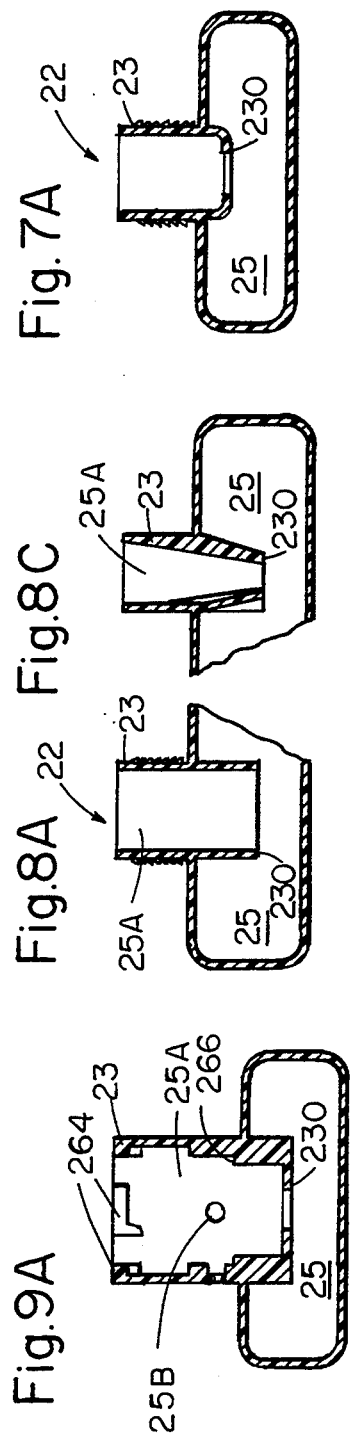
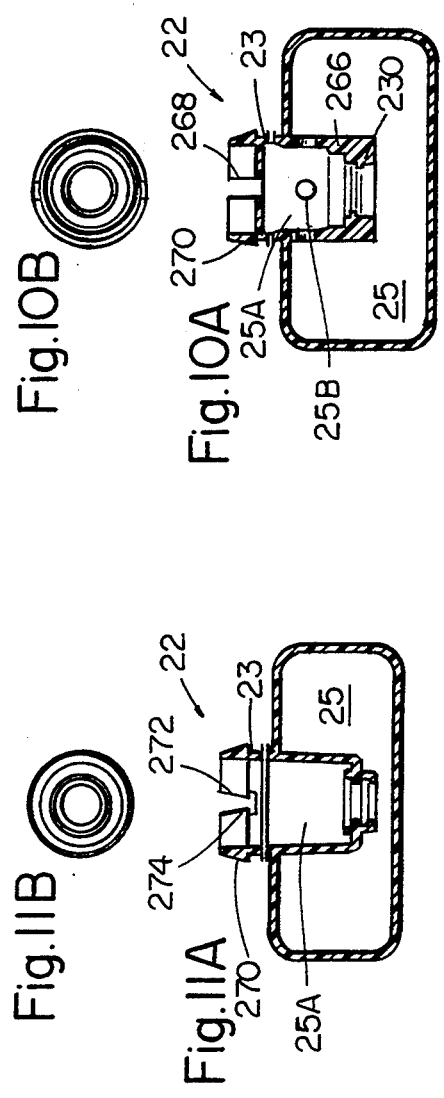

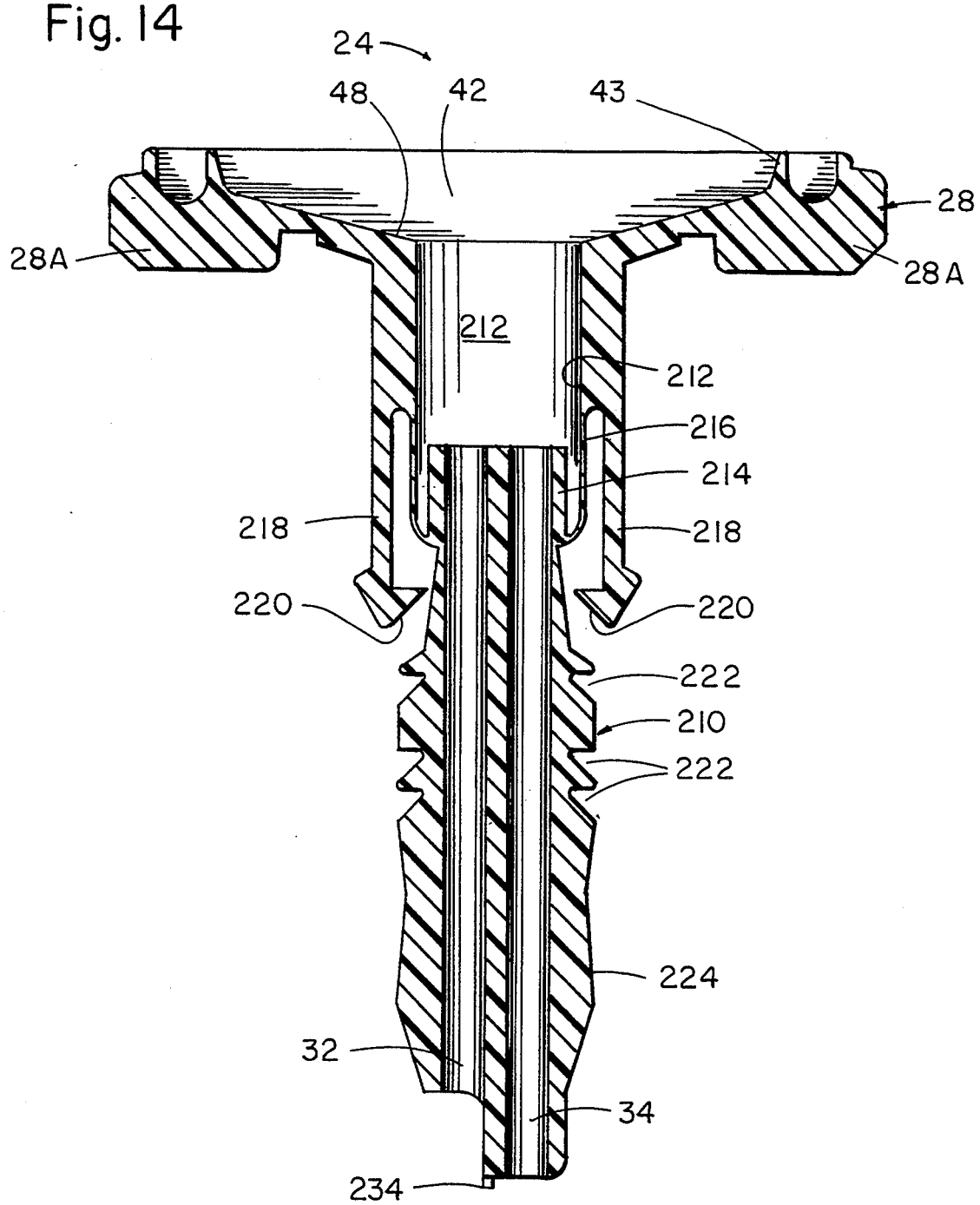

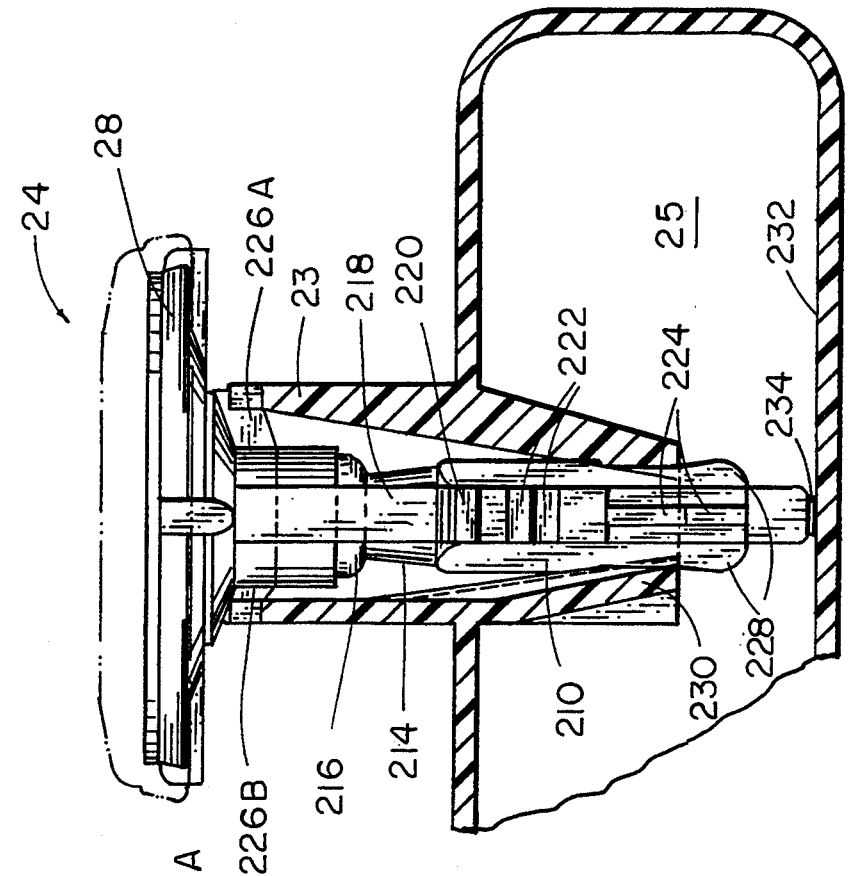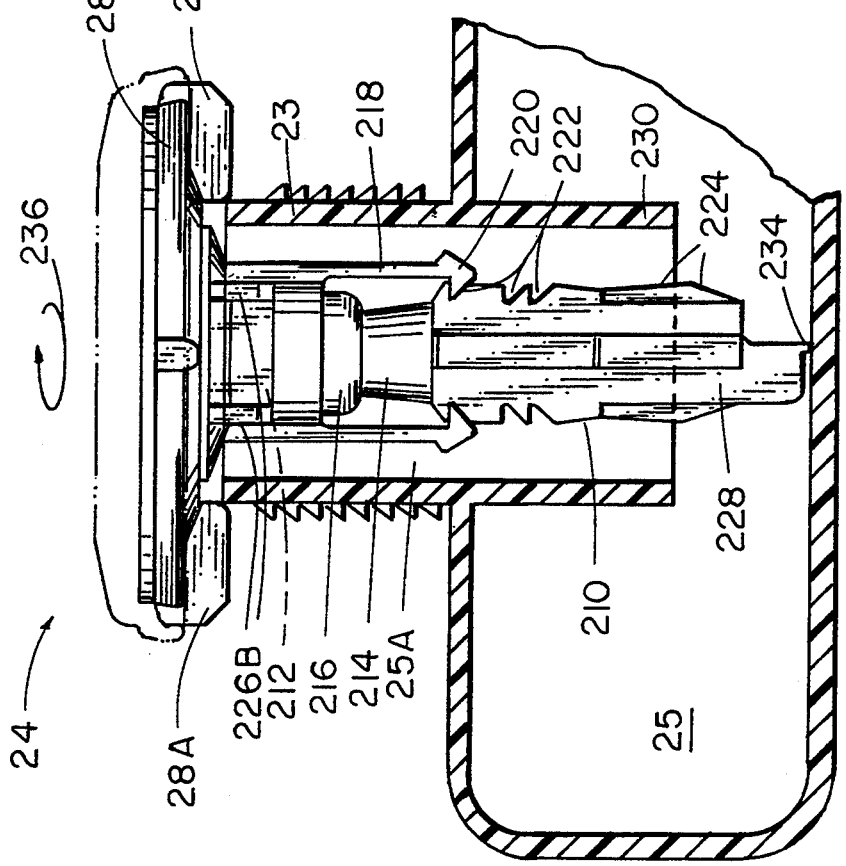

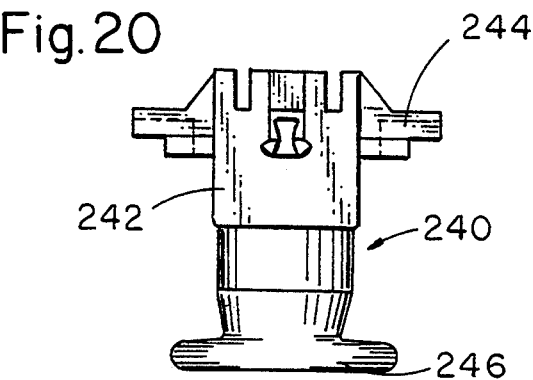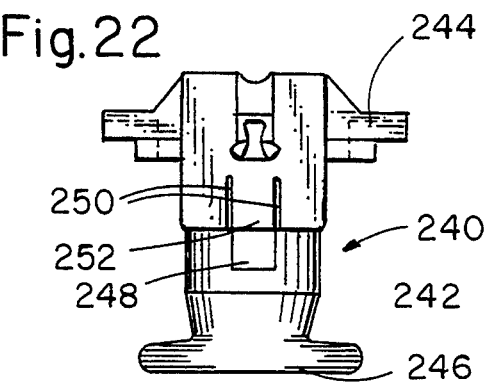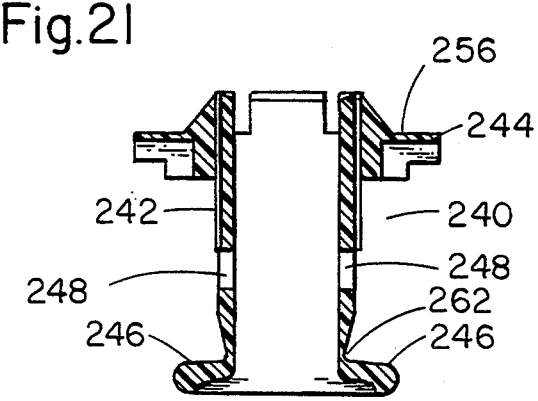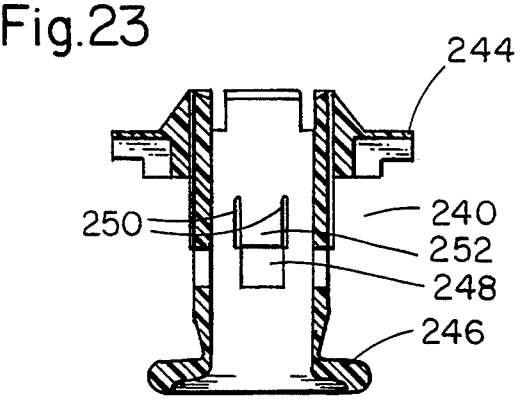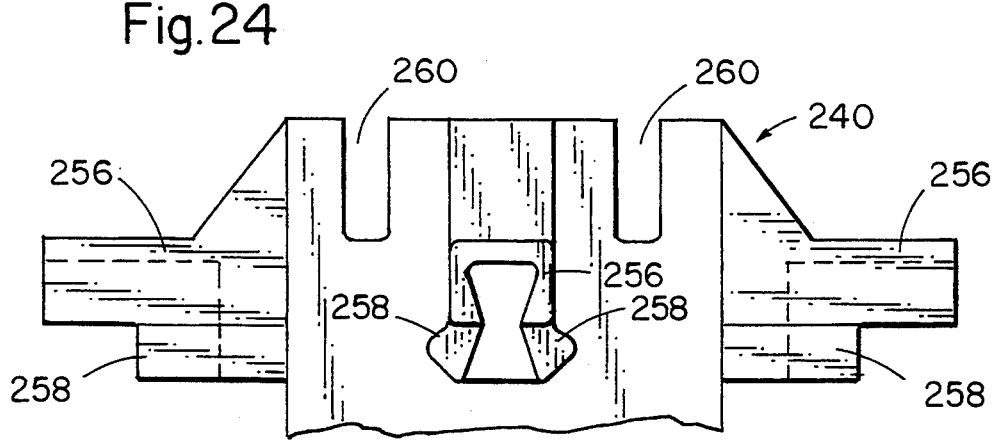

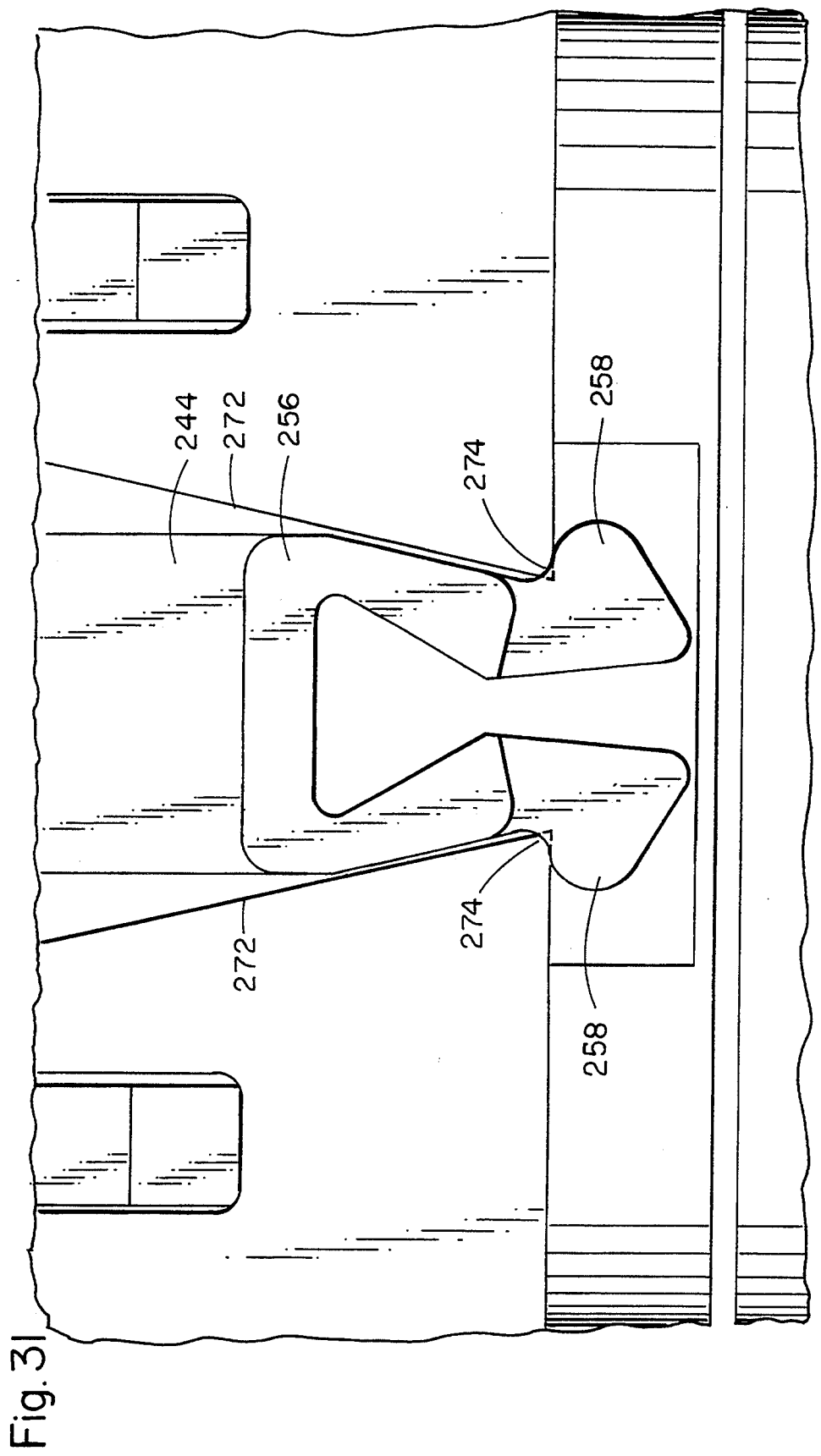

INDICATOR CAP

CROSS-REFERENCE TO RELATED APPLICATIONS

This application is a continuation-in-part application of U.S. patent application, Ser. No. 07/796,736, filed Nov. 25, 1991 now abandoned, which is a continuation-in-part application of U.S. patent application, Ser. No. 07/550,162 filed Jul. 9, 1990, now U.S. Pat. No. 5,078,077.

BACKGROUND OF THE INVENTION

1. Field of the Invention

This invention relates to caps for indicating a low level of fluid in a reservoir. More particularly, this invention relates to an indicator cap for a dishwasher rinse agent dispenser to visually indicate a low level of rinse agent in the dispenser's reservoir.

2. Description of the Background Art

Household dishwashers usually employ the use of a rinse agent to reduce the surface tension on the dishes being cleaned causing water to flow off of the dishes quicker. Water spotting is therefore substantially reduced.

Typically, dishwasher rinse agent dispensers are positioned on the inside of the dishwasher door. When the dishwasher door is in its opened, horizontal position, the dispenser's reservoir is capable of being filled with the rinse agent via a screw or lug cap. Usually, the dispenser's reservoir is sized to hold approximately four ounces of rinse agent, which lasts approximately three months during normal household use.

Unfortunately, the consumer often neglects to periodically unscrew the fill cap to visually check the level of rinse agent in the reservoir. Because of such inadvertence, all of the rinse agent in the reservoir is often dispensed and water spotting on the dishes resumes. Only after repeated washing without a rinse agent is the water spotting eventually noticed by the consumer. Often, the depletion of the rinse agent still goes unnoticed, and the spotting is wrongly blamed on the dishwasher, or the dishwasher soap.

Hence, there exists a need for indicating to the consumer a low level of rinse agent in the dispenser's reservoir so that additional rinse agent can be timely purchased and the reservoir refilled prior to depletion of the rinse agent.

Therefore, it is an object of this invention to provide an indicator cap for indicating a low level of rinse agent in a reservoir of a dishwasher rinse agent dispenser, the indicator cap comprising a body including a head portion having a cavity formed therein and a neck portion, means for vertically mounting the body into an opening in the reservoir with the neck portion extending downwardly into a bottommost area of the reservoir, a fluid passageway extending through the neck portion from an opened terminal end thereof to the cavity of the head portion, and visual pump means for pumping rinse agent through the first fluid passageway into the cavity to visually indicate the presence of the rinse agent in the cavity, whereby, air is allowed to flow upwardly through the first fluid passageway when the level of rinse agent in the reservoir is below the opened terminal end of the first fluid passageway causing drainage of rinse agent in the cavity to visually indicate a low level condition.

Another object of this invention is to provide an indicator cap as set forth hereinabove, further including a second fluid passageway extending through the neck portion from an opened terminal end thereof to the cavity of the head portion, the opened terminal end of the second fluid passageway being positioned lower than the opened terminal end of the first fluid passageway.

Another object of this invention is to provide an indicator cap as set forth hereinabove, wherein the pump means comprises a resilient diaphragm sealingly positioned over the cavity whereby, upon depressing of the diaphragm, the diaphragm flexes inwardly to force air in the cavity outwardly through the first fluid passageway and, upon release, the resiliency of the diaphragm draws rinse agent through the first fluid passageway into the cavity to be visually observed.

Another object of this invention is to provide an indicator cap as set forth hereinabove, wherein the indicator cap comprises a universal design which may be used in connection with rinse agent dispensers of different models.

Another object of this invention is to provide a universal indicator cap having a bellows neck portion which fits certain models of rinse agent dispensers and which may be bellowed inwardly to several retracted positions and locked into position to fit other models of rinse agent dispensers.

Another object of this invention is to provide a universal indicator cap having a removable gasket adaptor which fits certain models of rinse agent dispensers and which may be removed and discarded by the consumer to fit other models of rinse agent dispensers.

The foregoing has outlined some of the more pertinent objects of the invention. These objects should be construed to be merely illustrative of some of the more prominent features and applications of the intended invention. Many other beneficial results can be obtained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

The invention is defined by the appended claims with a specific embodiment shown in the attached drawings. For the purpose of summarizing the invention, the invention comprises an indicator cap for visually indicting the low level of a rinse agent in a reservoir of a rinse agent dispenser in a dishwasher.

More particularly, the indicator cap of the invention comprises an elongated body having a head portion forming a cavity and a depending neck portion. The neck portion is operatively designed to sealingly engage the opening in the rinse agent dispenser. The neck portion comprises two fluid passageways extending from the lowermost tip of the neck portion, through the neck portion and into the cavity of the head portion.

The head portion of the body is adapted to sealingly receive a pump mechanism having a translucent or transparent top. With the reservoir being filled with a colored rinse agent (usually blue), pumping of the pump causes the rinse agent to flow upwardly through the fluid passageways into the cavity to visually indicate the filled condition of the reservoir. The tip of the neck portion is angularly formed so that the first fluid passageway terminates at a position above the terminal end of the second fluid passageway. The shorter length of the first fluid passageway allows air to flow upwardly therethrough when the level of the rinse agent in the reservoir falls below the terminal end of the first fluid passageway. The cavity is therefore vented via the first fluid passageway and the cavity is drained of the rinse agent via the second fluid passageway. Hence, the shorter first fluid passageway functions as a vent passageway and the longer second fluid passageway functions as a drainage passageway.

During start-up, the indicator cap is removed and the reservoir is filled with the rinse agent. The pump mechanism is pumped to fill the cavity with rinse agent. The filled cavity is now fully "charged".

As the rinse agent is dispensed during each dishwashing cycle, the rinse agent level in the reservoir decreases. However, the cavity remains filled with the rinse agent because both terminal ends of the fluid passageways are below the level of the rinse agent in the reservoir. After continued use, the rinse agent level in the reservoir decreases to a low level point below the terminal end of the vent passageway. Air is then allowed to flow upwardly through the vent passageway into the cavity, causing drainage of the rinse agent in the cavity via the drainage passageway back into the reservoir. Since the cavity is drained of the colored rinse agent, the transparent top of the pump visually indicates the low level condition of the reservoir to the consumer. This advance notice encourages the consumer to purchase a bottle of the rinse agent during the next trip to the grocery store.

The indicator cap of the invention comprises a universal design so that it can be used in connection with different models of rinse agent dispensers made by different manufacturers. The universal design of the indicator cap includes a bellows neck portion which has a length to correspond to deeper rinse agent dispensers. The bellows neck portion is inwardly retractable to fit shallower models of rinse agent dispensers. A lock mechanism is provided for permanently securing the bellows neck portion into the desired position once initially adapted by the consumer to a specific rinse agent dispenser. The universal indicator cap of the invention also includes a gasket adaptor which permits the indicator cap to fit rinse agent dispensers having wider openings. The gasket adaptor may be removed and discarded by the consumer to fit rinse agent dispensers having narrower openings.

The universal indicator cap of the invention eliminates the need for purchasing different indicator caps for different models of dishwashers. Specifically, upon purchasing of the universal indicator cap of the invention, the consumer removes and discards the existing cap on the rinse agent dispenser of the dishwasher. If the original cap included a wide gasket, typically black in color, then the consumer merely orients the universal indicator cap in the dispenser's opening and screws or twists it to lock it into position. During this installation, the bellows neck portion may retract and lock into position to fit the particular model of the rinse agent dispenser. If the original cap did not include a wide, black gasket, then the consumer removes the gasket adaptor from the universal indicator cap of the invention and then positions the indicator cap into the dispenser's opening and screws or twists it into position. During this installation, the bellows neck portion appropriately retracts and is locked into position. Once initially adapted by the consumer, the universal indicator cap of the invention may then be repeatedly removed to permit refilling of the dispenser's reservoir with the rinse agent as needed.

The foregoing has outlined rather broadly the more pertinent and important features of the present invention in order that the detailed description of the invention that follows may be better understood so that the present contribution to that the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 5 is a cross-sectional view illustrating the third embodiment of the pump mechanism.

FIGS. 7A and 7B are a front cross-sectional view and a top view of a conventional early model Whirlpool rinse agent dispenser;

FIGS. 8A and 8B are a front cross-sectional view and a top view of a conventional early model General Electric rinse agent dispenser;

FIGS. 8C and 8D are a side cross-sectional view and a top view taken ninety degrees from FIGS. 8A and 8B;

FIGS. 9A and 9B are a front cross-sectional view and a top view of a conventional Frigidaire rinse agent dispenser;

FIGS. 10A and 10B are a front cross-sectional view and a top view of a late model Whirlpool rinse agent dispenser;

FIGS. 11A and 11B are a front cross-sectional view and a top view of a conventional late model General Electric rinse agent dispenser;

FIG. 14 is a longitudinal cross-sectional view of FIG. 12A;

FIG. 16 is a front view of the universal indicator cap of the invention installed in the early model General Electric rinse agent dispenser of FIGS. 8A and 8B and FIG. 17 is a side view thereof;

FIG. 20 is a front view of the gasket adaptor and FIG. 21 is a cross-sectional view thereof;

FIG. 22 is a side view of the gasket adaptor and FIG. 23 is a cross-sectional view thereof;

FIG. 24 is a partial enlarged view of the gasket adaptor illustrating the configuration of one of its four latch arms;

FIG. 31 is a partial enlarged view of the latch arm of the gasket adaptor fitted into the V-shaped slot formed in the opening of the General Electric rinse agent dispenser of FIGS. 11 and 30.

Similar reference characters refer to similar parts throughout the several views of the drawings.

DETAILED DESCRIPTION OF THE PREFERRED EMBODIMENT

Figure 1:
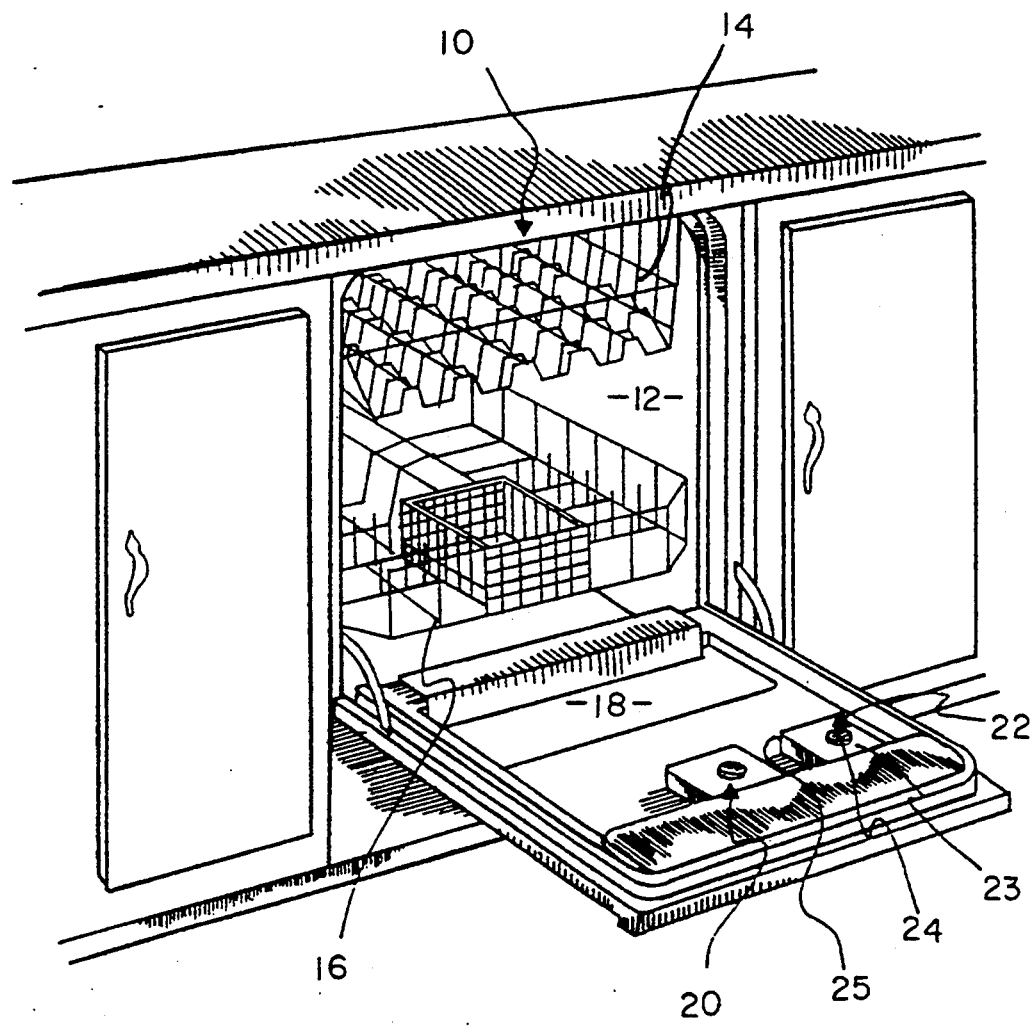
FIG. 1 is a perspective view of a front opening dishwasher illustrating the dishwasher door having a rinse agent dispenser positioned within the door thereof.

Referring to FIG. 1, a front loading dishwasher 10 comprises a front opening tub 12 having top and bottom dish racks 14 and 16 reciprocatably mounted therein. The dishwasher 10 further comprises a door 18 hingely connected to the lower edge of the tub 12. The door 18 is designed to sealingly engage over the front opening of the tub 12 when in a vertical, closed position (not shown). When opened to a horizontal position as shown, dishes may be loaded into or removed from the racks 14 or 16.

A detergent dispenser, generally indicated by numeral 20, is positioned on the inside of the door 18. The detergent dispenser 22 is designed to be filled with dishwashing detergent for dispensing into the tub 12 during the wash cycle.

A rinse agent dispenser, generally indicated by numeral 22, is also positioned on the inside of the dishwasher door 18. The rinse agent dispenser 22 is designed to be filled with a rinse agent via an opening 23 in the dispensing reservoir 25 for dispensing into the tub 12 during the rinse cycle. The present invention comprises a removable indicator cap, generally indicated by numeral 24, which extends into the reservoir 25 to visually indicate a low level of rinse agent in the dispenser's reservoir 25.

Figure 2:
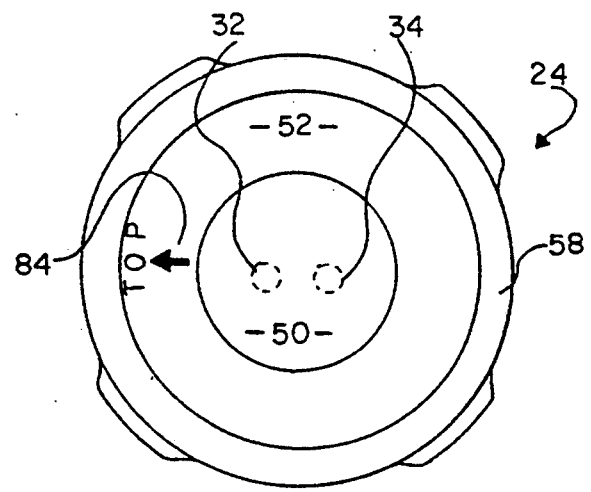
FIG. 2 is a top view of the indicator cap of the invention.
Figure 3:
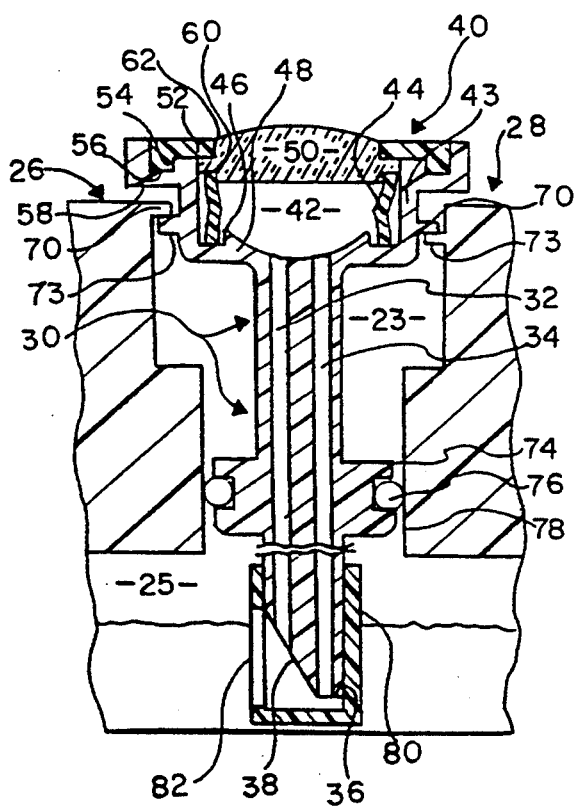
FIG. 3 is a cross-sectional view of FIG. 2 along lines 3—3 illustrating the two fluid passageways extending through the neck portion of the body of the indicator cap and illustrating the first embodiment of the pump mechanism.

More particularly, referring to FIGS. 2 and 3, the indicator cap 24 of the invention comprises a body, generally indicated by numeral 26, having a head portion 28 and a elongated neck portion 30. First and second fluid passageways 32 and 34 are positioned longitudinally within the neck portion 30 and extend from the head portion 28 to the terminal end 36 of the neck portion 30. The terminal end 36 of the neck portion 30 is formed at an angle 38 through the first fluid passageway 32 so that the first fluid passageway 32 is formed shorter than the second fluid passageway 34. The neck portion 30 is dimensioned to extend into a bottommost area of the reservoir 25.

The head portion 28 of body 26 is adapted to receive a pump, generally indicated by numeral 40, for pumping rinse agent upwardly through the fluid passageways 32 and 34 into a cavity 42 formed by upstanding annular wall 43 in the head portion 28.

Pump Mechanisms

In the first embodiment shown in FIG. 3, pump mechanism 40 comprises an annular bellow 44 composed of a resilient material which sealingly engages an annular slot 46 formed in the bottom 48 of the cavity 42. A rigid diaphragm 50, composed of a translucent (or transparent) material, sealingly engages over the other end of the bellow 44. The diaphragm 50 is secured into position by means of a retaining ring 52 having depending lip 54 which securely engages into annular slot 56 formed in the upper edge 58 of the annular wall 43 of the head portion 48. The diaphragm 50 may include upper and lower annular steps 60 and 62 for concentrically locating the diaphragm 50 in engagement with the bellow 44 and the retaining ring 52.

During use, depression of the diaphragm 50 causes the resilient wall of bellow 44 to flex and force air in the cavity 42 downwardly through fluid passageways 32 and 34. Upon release of the diaphragm 50, the memory of the resilient bellow 44 forces the diaphragm upwardly to pump rinse agent upwardly through the fluid passageways 32 and 34 into the cavity 42.

Figure 4:
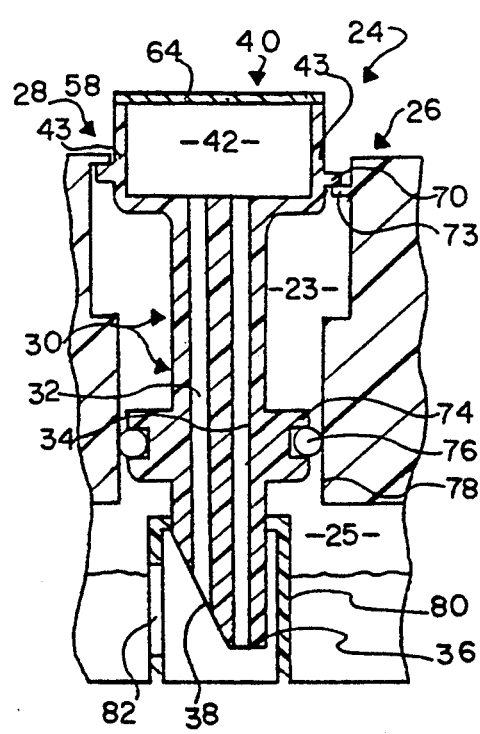
FIG. 4 is a cross-sectional view illustrating the second embodiment of the pump mechanism.

In the second embodiment shown in FIG. 4, pump mechanism 40 comprises a resilient translucent (or transparent) diaphragm 64 which is hermetically sealed to the annular upper edge 58 of the annular wall 43 of the cavity 42. Similar to the first embodiment, depressing of the diaphragm 64 causes the diaphragm to flex inwardly to force air in the cavity 42 downwardly out the fluid passageways 32 and 34. Upon release, the memory of the resilient diaphragm 64 draws the rinse agent through the fluid passageways 32 and 34 into the cavity 42. The translucence of the diaphragm 64 allows the consumer to see the rinse agent in the cavity 42.

In the third embodiment as shown in FIG. 5, pump mechanism 40 comprises a resilient translucent (or transparent) diaphragm 100 having a depending annular U-shaped bead 102 formed about its outer annular periphery. U-shaped bead 102 is dimensioned and configured to sealingly fit into a corresponding annular groove 104 formed about the outer horizontal periphery of the upstanding annular wall 43 which angles outwardly so as to define an inverted conical-shaped cavity 42. The diaphragm 100 includes an annular bellow 106 to enhance the resiliency of the diaphragm 100. The bead 102 of the diaphragm 100 is retained in its sealed position in the annular groove 104 by means of an annular retaining ring 108 having depending leg 110 with inwardly extending lip 112 dimensioned such that the leg 110 is positioned about the outer periphery of the upstanding annular wall 43 defining the cavity 42 with the lip 112 removably engaged under an annular protrusion 114 of the annular wall 43. The innermost annular edge 116 of the retaining ring 108 is angled downwardly to fit into the annular bellow 106 so as to impair the upper (outward) flexing of the resilient diaphragm 100.

Custom Indicator Caps

Referring to FIGS. 3 and 4, indicator cap 24 of the invention is designed to sealingly engage in the opening 23 of the reservoir 25 of the rinse agent dispenser 22. In this regard, indicator cap 24 may be custom configured to replace the existing screw or lug fill cap of specific dishwasher rinse agent dispensers 24 (e.g. Frigidaire), in which case appropriate lugs 70 may be formed exterially of the head portion 28 of the body 26 so as to threadably engage the existing lugs 73 of the reservoir's opening 23. As shown in FIG. 5, the indicator cap 24 may alternatively be custom configured to replace existing twist-on fill caps of existing dishwasher rinse agent dispensers 20 (e.g., late model Whirlpool), in which case a pair of lugs 120 may be formed exterially of the neck portion 30 of the body 26 to extend outwardly and engage the corresponding twist-on thread 122 of the reservoir's opening 23.

In each embodiment, the neck portion 30 may be configured with an annular slot 74 to receive a conventional O-ring 76 for sealing with the lumen 78 of the reservoir's opening 23, thereby defining a mixing chamber 25A thereabove into which the dispenser 22 injects a measured quantity of the rinse agent via injector opening 25B during each cycle.

Universal Indicator Cap

Instead of being custom designed for specific models of rinse agent dispensers 22 as noted above, the indicator cap 24 of the invention may be universally designed to fit different models of rinse agent dispensers 20. Specifically, the indicator cap 24 of the invention may comprise a universal design to fit the major models of dishwashers presently being marketed. As set forth in the following table, FIGS. 7-11 illustrate the models of rinse agent dispensers 22 that constitute the majority of early and late model dispensers 22:

| FIG. | MODELS OF RINSE AGENT DISPENSERS |
| --- | --- |
| FIG. 7 | early model Whirlpool |
| FIG. 8 | early model General Electric |
| FIG. 9 | Frigidaire |
| FIG. 10 | late model Whirlpool |
| FIG. 11 | late model General Electric |

The universal design of the indicator cap 24 of the invention eliminates the need for a custom fitted indicator cap 24 for each particular model of rinse agent dispenser 22. As a result, the universal indicator cap 24 may be sold along with the rinse agent by the rinse agent manufacturer. In this manner, the consumer is encouraged to replace the existing reservoir cap with the universal indicator cap 24 of the invention. The rinse agent manufacturer enjoys increased sales and the consumer enjoys clearer dishes without water spots.

Figure 13B:
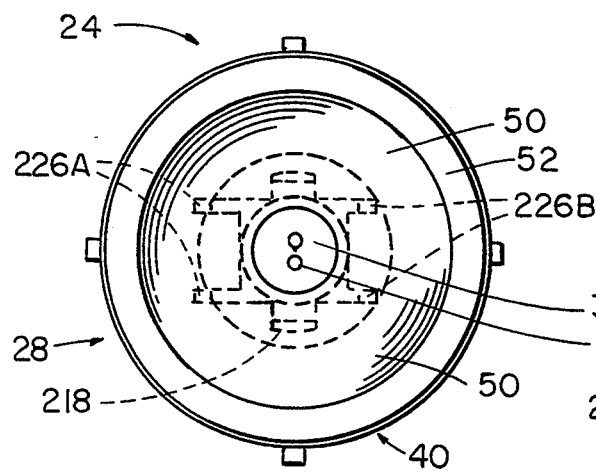
FIGS. 13A and 13B are side and top views of the universal indicator cap taken ninety degrees from FIGS. 12A and 12B.
Figure 12B:
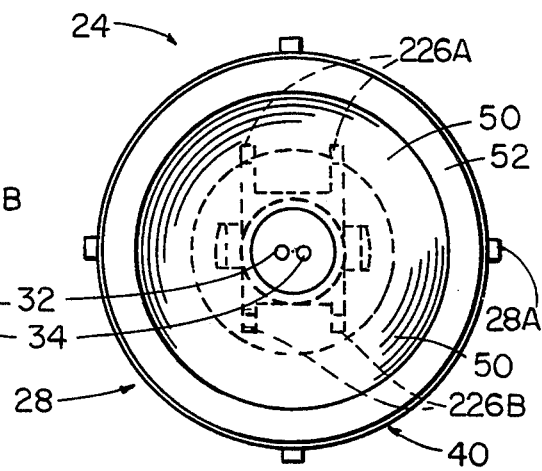
FIGS. 12A and 12B are front and top views of the universal indicator cap of the invention.
Figure 13A:
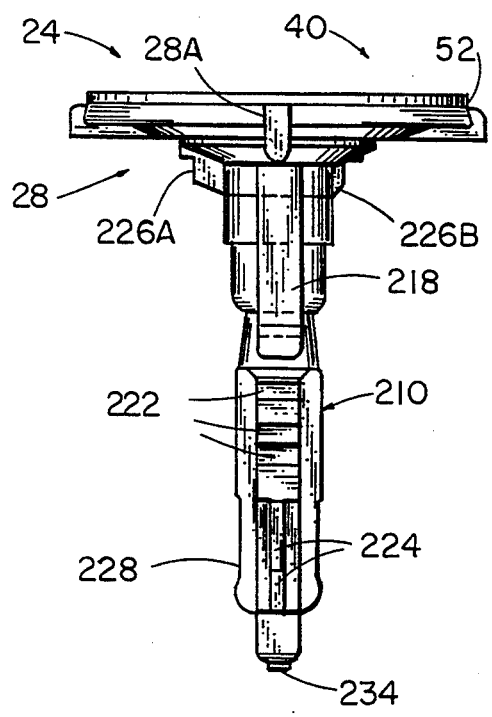
Figure 12A:
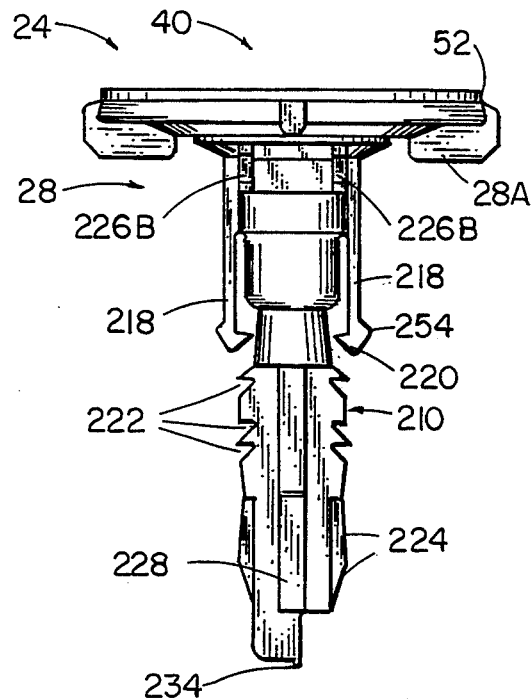

More particularly, as shown in FIGS. 12-14, the universal indicator cap 24 of the invention comprises a bellows neck portion 210 which is retractable into the cavity 42 of the head portion 28 so as to adapt the indicator cap 24 to a specific length, thereby decreasing the depth in which the neck portion 210 extends into the reservoir 25 of the rinse agent dispenser 22 and, for those dispensers 22 that do not employ a mixing chamber 25A, assuring that the indicator cap 24 will form a seal with the opening 23 of the reservoir 25. For those dispensers 22 that do employ a mixing chamber 25A, diametric ribs 28A prevent the indicator cap 24 from forming a seal with the opening 23.

As best shown in FIG. 14, the first and second fluid passageways 32 and 34 extend from cavity 42 through the bellows neck portion 210. The bottom 48 of the cavity 42 includes a bottom opening 212 having an inner diameter appreciably greater than the outer diameter of the upper portion 214 of the bellows neck portion 210 to permit the upper portion 214 to move upwardly therein. A bellows 216 is integrally formed between the bottom opening 212 of the cavity 42 and the upper portion 214 of the bellows neck portion 210. The head portion 228 and the bellows neck portion 212 are integrally formed with bellows 216 of a resilient material to permit the upper portion 214 of the neck portion 210 to retract upwardly into the bottom opening 212 by the bellowing of the bellows 216. In this manner, the length of the bellows neck portion 210 may be adapted to rinse agent dispensers 22 having reservoirs 25 of shallow depths.

Diametrically opposing bayonet lock arms 218 are provided to lock the neck 212 into a fixed retracted position. The bayonet lock arms 218 extend from the bottom opening 212 and include inwardly extending catches 220 which engage into corresponding indentations 222 formed on the outer surface of the bellows neck portion 210. As will be described hereinafter, indentations 224 are dimensionally positioned along the length of the bellows neck portion 210 to adapt the indicator cap 24 to a specific length. In regard to reservoirs 25 that do not utilize mixing chambers 25A, the lock arms 218 therefore function to assure proper sealing of the head portion 28 about the opening 23 of the reservoir 25. The lock arms 28 also function to preclude the extension and retraction flexing of bellows 216 each time the indicator cap 24 is removed, that could otherwise cause premature rupturing of the bellows 216.

The bellows neck portion 210 includes a lower ramp portions 224 and 228 for securing the indicator cap 24 into different models of rinse agent dispensers 20. The indicator cap 24 further includes dual orientation lugs 226A and 226B extending rearwardly and forwardly from the underside of the head portion 28 to orient the indicator cap 24 to certain models of rinse agent dispensers 20.

Figure 15:
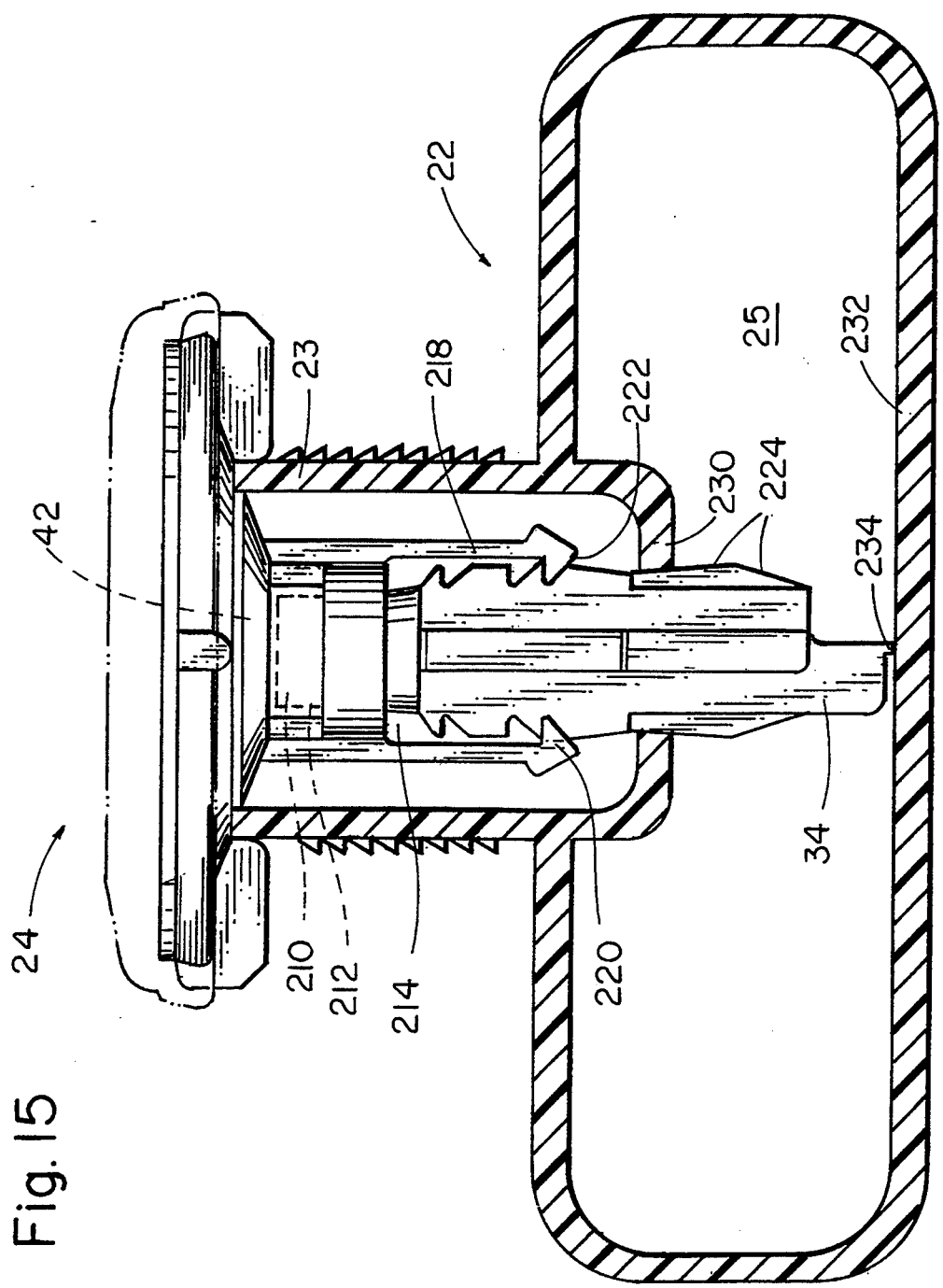
FIG. 15 is a front view of the universal indicator cap of the invention installed into the early model Whirlpool rinse agent dispenser of FIGS. 7A and 7B.
Figure 18:
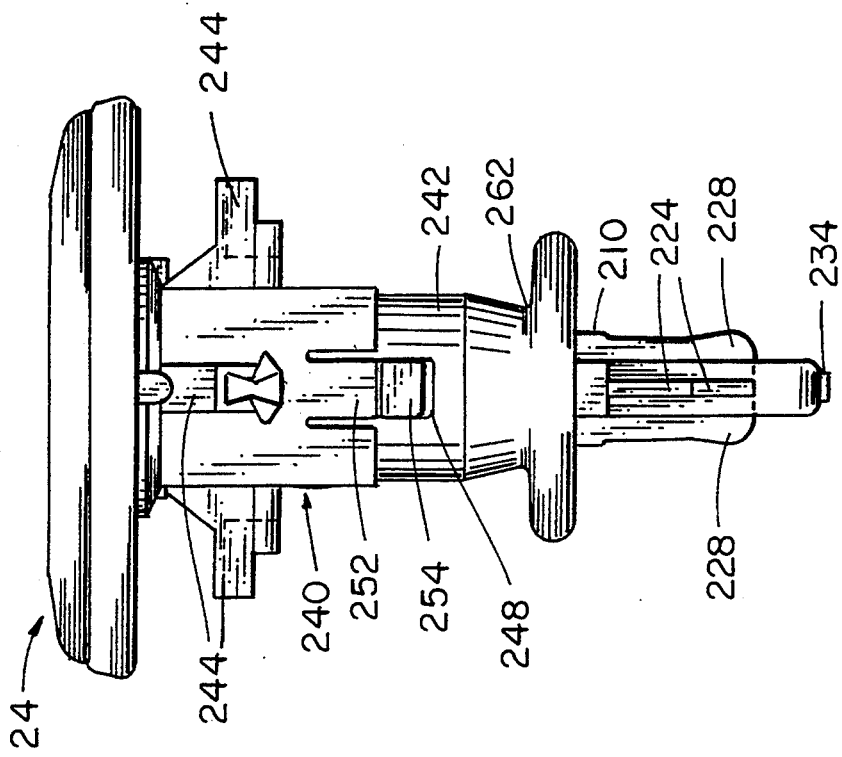
FIG. 18 is a front view of the universal indicator cap of the invention having its gasket adaptor installed thereon and FIG. 19 is a side view thereof.
Figure 19:
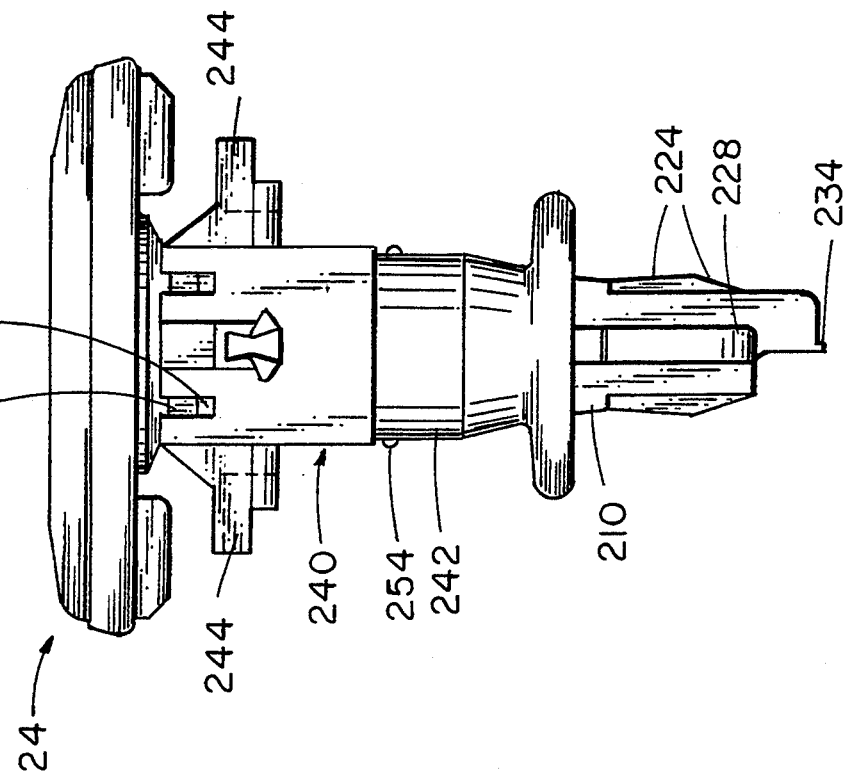

As illustrated in FIG. 15, the universal indicator cap 24 of the invention is easily installed into a conventional early model Whirlpool rinse agent dispenser 22 shown in FIGS. 7A and 7B. These early model Whirlpool dispensers 22 do not employ a mixing chamber 25A and therefore the underside of the indicator cap 24 must seal with the reservoir's opening 23.

Specifically, as shown in FIG. 15, the indicator cap 24 is installed by simply inserting the bellows neck portion 210 into the opening 23 of the reservoir 25 and then pressing with a downward force such that the bottom tip 234 of the bellows neck portion 210 is forced through a reduced diameter opening 230 of the reservoir 25. In this regard, it is noted that the lower ramp portion 224 permits the tip 234 to resiliently engage through the reduced diameter opening 230 and then resiliently secures the bellows neck portion 210 into position with the bottom tip 234 being bottomed against the bottom 230 of the reservoir 25. Further downward movement on the indicator cap 24 causes the upper portion 214 of the bellows neck portion 210 to retract into the bottom opening 212 of the cavity 42 by the bellowing of bellows 216. The catches 220 of the bayonet lock arms 218 slide along the length of the bellows neck portion 210 until such time as the catches 220 engage into the lowermost indentation 222, thereby locking the bellows neck portion 210 in its fully retracted position. It is noted that the angle of the lower ramp portion 224 relative to the diameter of the reduced diameter opening 230 and the dimensioning of the lowermost indentation 222 relative to the length of the bellows neck portion 210 are such that the head portion 28 is properly sealed about the opening 23 of the reservoir 25. It is further noted that the bottom tip 234 functions as a stand-off spacer to assure free flow of fluid through the second fluid passageway 34.

The universal indicator cap 24 of the invention may also be easily adapted to early General Electric models of rinse agent dispensers 22 of FIGS. 8A-8D. Specifically, early model General Electric dispensers 22 include an opening 23 into the reservoir 25 that is D-shaped. The opening 23 further includes a reduced diameter opening 230 which includes a generally oblong configuration.

As shown in FIGS. 16 and 17, the indicator cap 24 is installed into opening 23 in such manner that the dual orientation lugs 226 are positioned lengthwise within the D-shaped opening 23. During downward positioning, the upper portion 214 of the bellows neck portion 210 retracts into the bottom opening 212 of the cavity 42 by virtue of the resilient bellowing of bellows 216. Upon further downward pressing, the tip 234 is seated against the bottom 232 of the reservoir 25 and the catches 220 of the bayonet lock arms 218 lock into the uppermost indentations 222. The indicator cap 24 may then be rotated in the direction of arrow 236 at which point the dual orientation lugs 226A and 226B properly locate the indicator cap 24 into position. In this regard, due to the offset of the reduced diameter opening 230 relative to opening 23, it is noted that dual orientation lugs 226A are longer than 226B. During this twisting motion, the lower ramp portion 228 resiliently engages the oblong-shaped reduced diameter opening 230 to secure the indicator cap 24 into position.

The universal indicator cap 24 of the invention further comprises a gasket adaptor 240 which fits around the bellows neck portion 210 so as to increase the effective diameter thereof so that the indicator cap 24 is adaptable to rinse agent dispenser reservoirs 25 having wider openings 23.

More particularly, as illustrated in FIGS. 18-26, the gasket adaptor 240 comprises an elongated body portion 242 having four latch arms 244 extending from the upper end thereof and a gasket flange 246 extending from the lower end thereof.

The elongated body portion 242 of the gasket adaptor 240 includes an inside diameter substantially equal to the outside diameter of the bellows neck portion 210 such that the gasket adaptor 240 may be resiliently slid thereon. The elongated body portion 242 further comprises a pair of diametrically opposed notches 248. A pair of slots 250 extend above the notches 248 to define a resilient tab 252. The notches 248 are dimensioned on the elongated body portion 242 of the gasket adaptor 240 in such a manner that corresponding protuberances 254 extending outwardly from the bayonet lock arms 218 of the bellows neck portion 210 engage therein. The tab 252 functions to releasably secure the gasket adaptor 240 in position with the protuberances 254 extending through notches 248.

The latch arms 244 of the gasket adaptor 240 extend radially outwardly in each of four quadrants. As best shown in FIG. 24, the tips 256 of the latch arms 244 include retaining clip portions 258, the purpose of which will be described hereinafter. It is noted that the top surface of the elongated body portion 242 includes four slots 260 for receiving the four orientation lugs 226 when the gasket adaptor 240 is positioned on the bellows neck portion 210.

Figure 25:
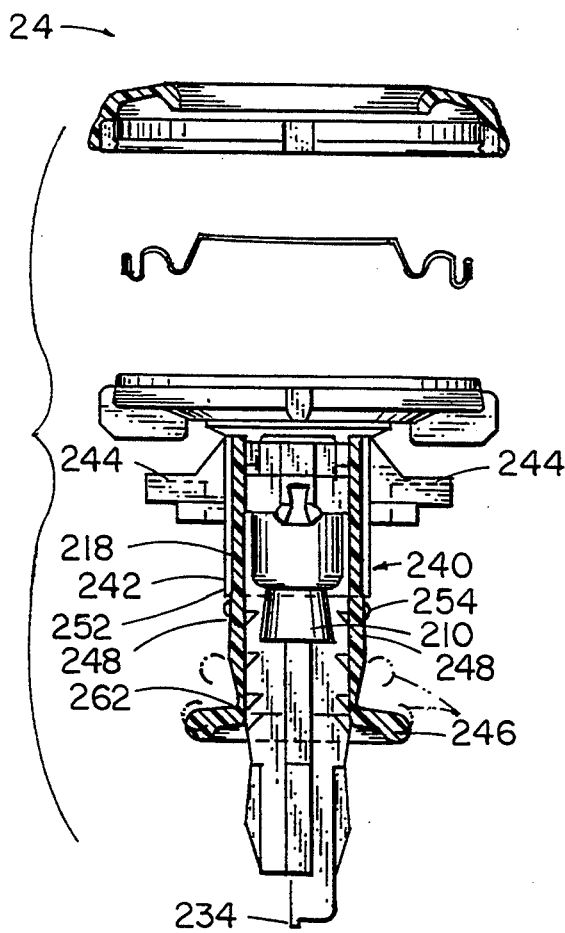
FIG. 25 is a frontal cross-sectional partial exploded view of the universal indicator cap having the gasket adaptor installed thereon illustrating in phantom the upward movement of the gasket flange.
Figure 26:
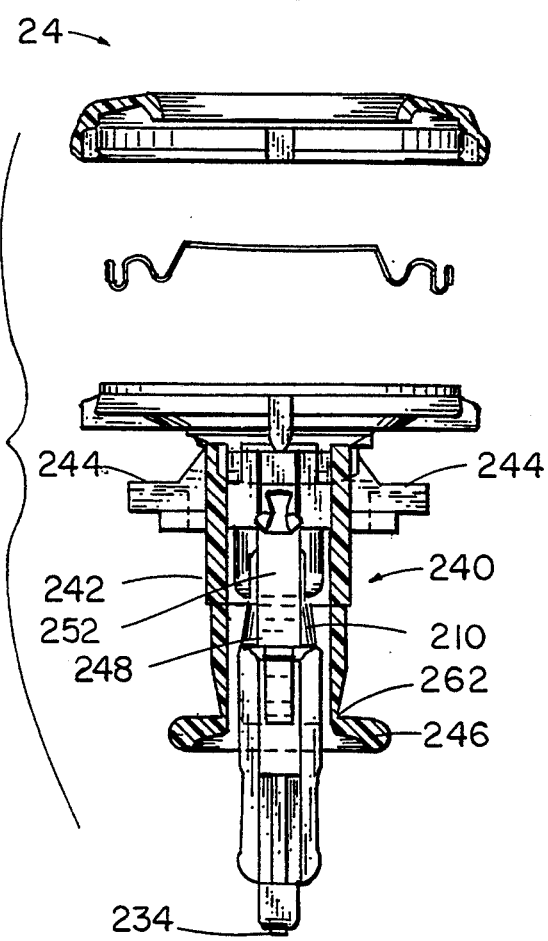
FIG. 26 is a side cross-sectional partially exploded view of the universal indicator cap having the gasket adaptor installed thereon.
Figure 27:
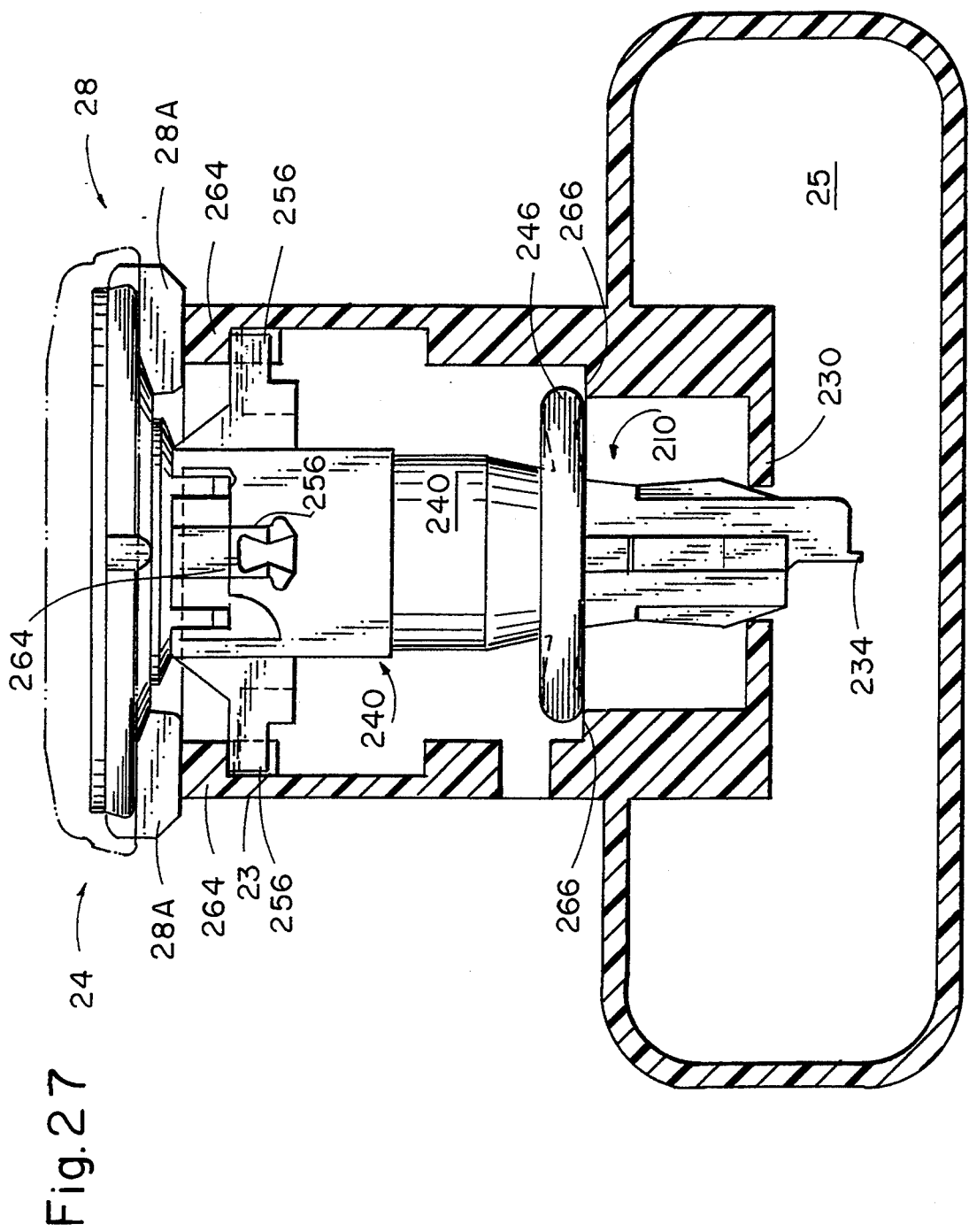
FIG. 27 is a front view of the universal indicator cap of the invention installed into the Frigidaire rinse agent dispenser of FIG. 9.

The gasket flange 246 comprises a generally annular design which is integrally formed to the bottom end of the elongated body portion 242 to define an annular living hinge 262 (see FIGS. 21 and 23) which permits upward resilient flexing of the gasket flange 246 (see FIG. 25).

The gasket adaptor 242 allows the universal indicator cap 24 to be used in connection with the Frigidaire, late model Whirlpool and late model General Electric rinse agent dispensers 22 as illustrated in FIGS. 9-11, respectively.

More particularly, as shown in FIG. 9, Frigidaire rinse agent reservoirs 25 utilize a mixing chamber 25A and a rinse agent injector opening 25B which injects the desired amount of rinse agent into the mixing chamber 25A for mixing.

The bellows neck portion 210 of the universal indicator cap 24 of the invention does not need to be retracted for use in the Frigidaire dispenser 22. Specifically, the indicator cap 24 is simply inserted within the opening 23 of the reservoir 25 and rotated until the tips 256 of the latch arms 242 snap under retaining lugs 264 of the opening 23. When in this closed position, the gasket flange 246 is seated against a corner 266 formed in the lumen of the opening 23. It is noted that the tip 234 of the bellows neck portion 210 extends through the reduced diameter opening 230 into the reservoir 25. It is also noted that the diametric ribs 28A of the head portion are seated against the upper edge of the opening 23 to permit fluid flow from the interior of the dishwasher 10 into the mixing chamber 25A.

Figure 28:
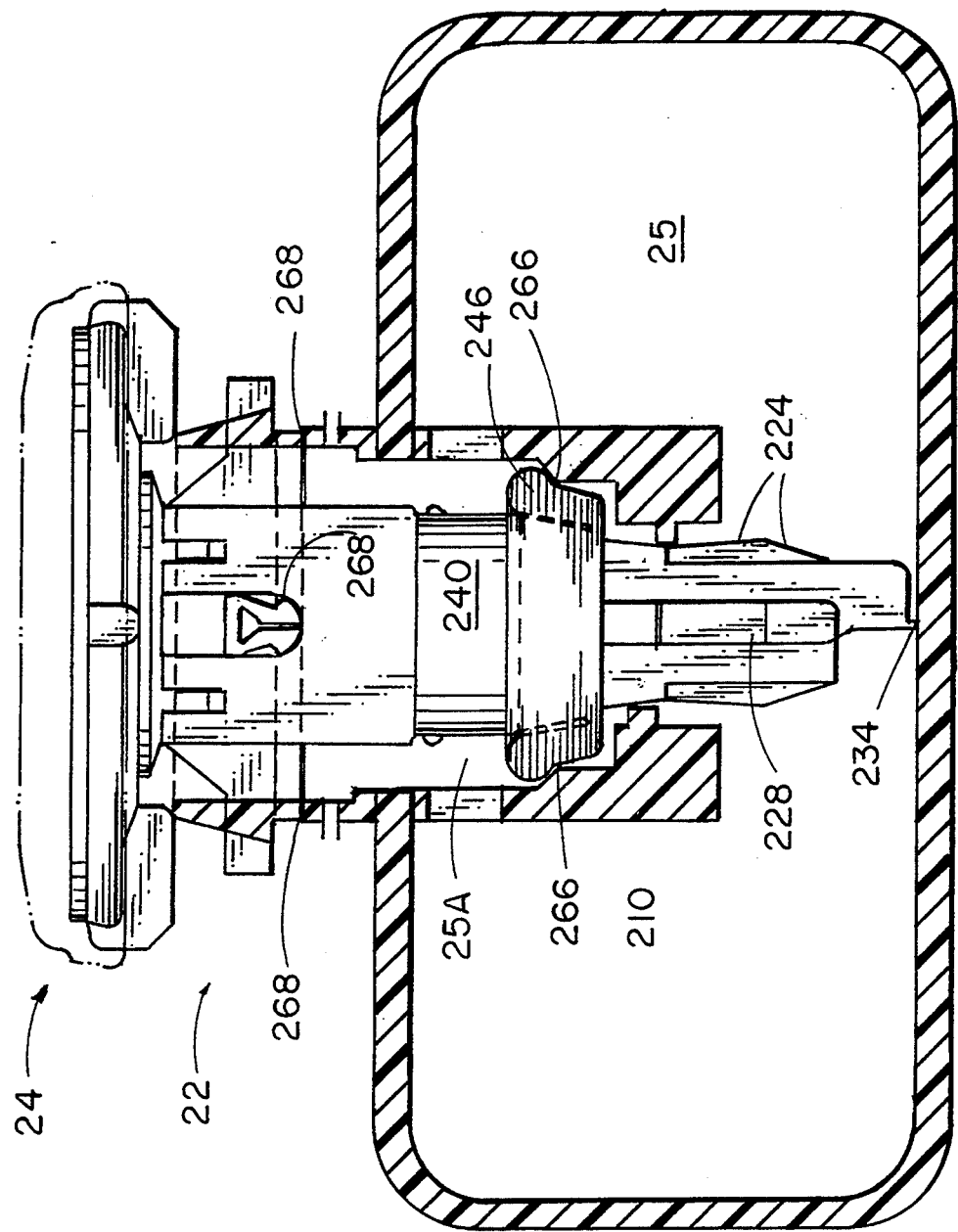
FIG. 28 is a front view of the universal indicator cap of the invention installed into the late model Whirlpool rinse agent dispenser of FIG. 10.

As shown in FIG. 28, the universal indicator cap 24 of the invention may also be used in connection with the late model Whirlpool dispensers 22 of FIG. 10. Specifically, the late model Whirlpool reservoir 25 comprises opening 23 having four rounded-bottomed slots 268 formed in the angled top surface 270 thereof. Opening 23 further includes a corner 266 formed on the lumen of the opening 26 and a reduced diameter portion 230. The Whirlpool dispensers 22 employ a mixing chamber 25A and rinse agent injection opening 25B.

Figure 29:
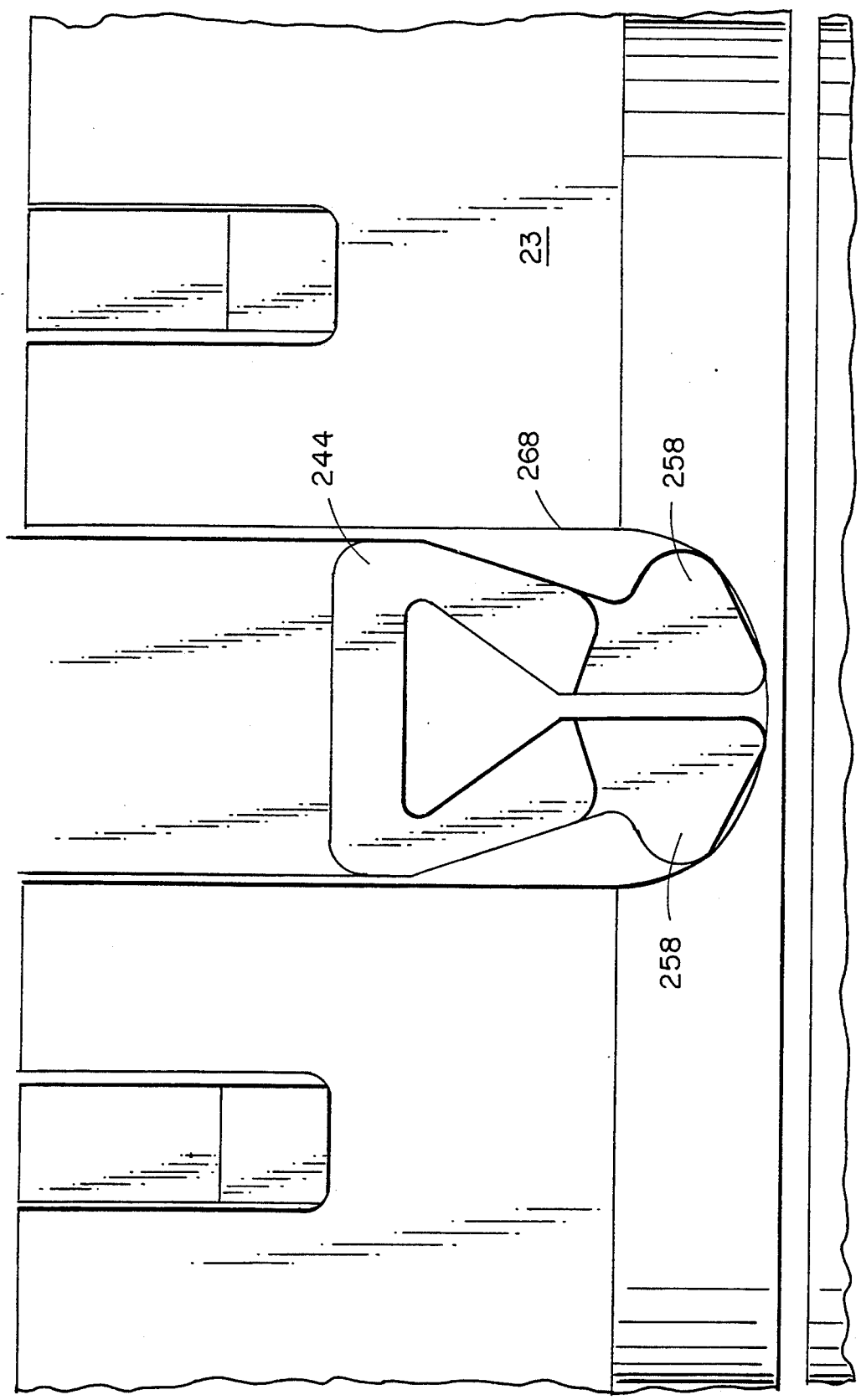
FIG. 29 is a partial enlarged view of the latch arm fitted into the rounded-bottom slot formed in the opening of the Whirlpool rinse agent dispenser of FIGS. 10 and 28.

As shown in FIG. 28, the universal indicator cap 24 of the invention is utilized in connection with the late model Whirlpool dispensers 22 by inserting the bellows neck portion 210 into the opening 23 and pressing downwardly to force the bellows neck portion 210 to retract inwardly. The bellows neck portion 210 is then latched in position by means of the latch arms 218 engaging into the indentations 222, thereby setting the length of the indicator cap 24. During such downward movement, the latch arms 244 are aligned with the corresponding slots 268 and the lower ramp portions 224 and 228 engage through the threads of the reduced diameter portion 230 thereby securing the indicator cap 24 into position. It is noted that during such downward movement, the gasket flange 246 hinges upwardly at living hinge 262 so as to form an annular seal with corner 266. As shown in FIG. 29, the retaining clip portion 258 of the latch arms 244 slide into the rounded-bottomed slots 268 of the opening 23 but do not releasably engage therein.

Finally, universal indicator cap 24 of the invention may be utilized in connection with late model General Electric dispensers 22 of FIG. 11. Late model General Electric dispensers 22 comprise an opening 23 having angled top surface 270 and four V-shaped slots 272 formed therein. These General Electric dispensers 22 employ a mixing chamber 25A.

Figure 30:
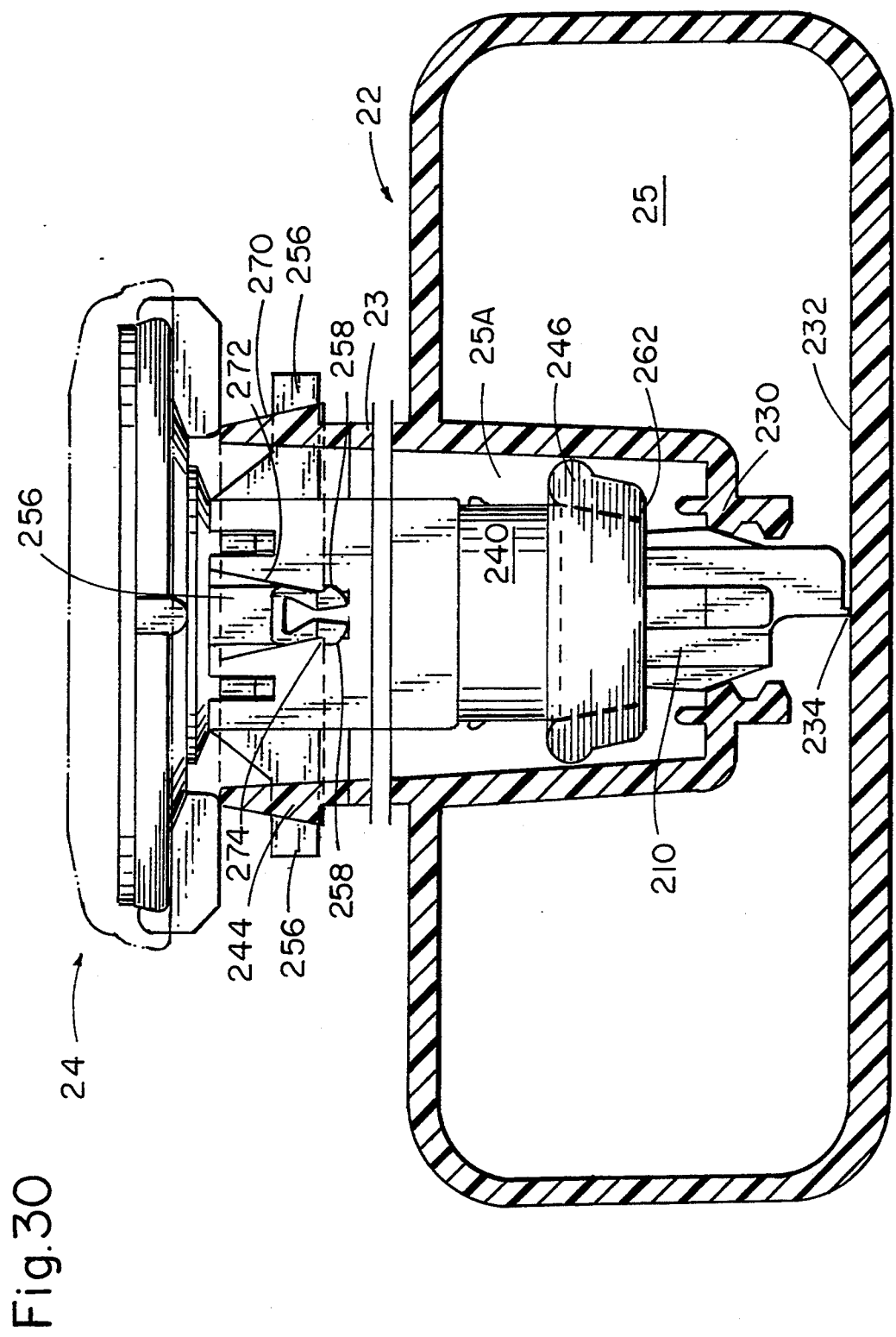
FIG. 30 is a front view of the universal indicator cap of the invention installed into the late model General Electric rinse agent dispenser of FIG. 11.

As shown in FIG. 30, the indicator cap 24 is positioned within the opening 23 and pressed downwardly to force the bellows neck portion 210 to retract fully within the bottom opening 212 of the head portion 28. In this regard, it is noted that the tip 234 is seated against the bottom 232 of the reservoir 24; however, the lower ramp portions 224 and 228 do not engage the reduced diameter portion 230 of the opening 23. Notwithstanding, as shown in FIG. 31, the indicator cap 24 is releasably held into position by means of the retaining clip portions 258 of the tips 256 of the latch arms 244 which engage into the V-shaped slots 272 and then spread apart to releasably engage under corners 274 formed by the angled surface 270 and the V-shaped slots 272. It is also noted that the gasket flange 246 flexes upwardly at living hinge 262 to form an annular seal with the lumen of the opening 23.

From the foregoing, it should be appreciated that the universal indicator cap 24 is readily adapted for use in conjunction with the models of rinse agent dispensers 22 listed in the above table. Specifically, the universal cap 24 may be purchased by a consumer to replace the existing rinse agent cap. If the existing rinse agent cap contains a wide gasket, usually black, the consumer uses the indicator cap 24 with the gasket adaptor 240. If the existing rinse agent cap does not include a wide, black gasket, then the consumer simply removes and discards the gasket adaptor 240 and uses the universal indicator cap 24 by itself.

Filling and Draining of Indicator Cap

It is noted that cavity 42 of the head portion 28 may drain when the dishwasher door 18 is moved from its open, horizontal position to its closed, vertical position since the fluid passageways 32 and 34 will then be positioned horizontally and, except when the reservoir 25 is nearly full, the ends thereof will be exposed to air in the reservoir 25. As shown in FIGS. 3 and 4, in order to prevent drainage of the cavity 42 when the fluid passageways 32 and 34 are positioned horizontally, the neck portion 30 may be fitted with a boot 80 with side opening 82 which sealingly engages over the fluid passageways 32 and 34 about the terminal end 36 of the neck portion 30. The side opening 82 allows the rinse agent and air to flow into the fluid passageways 32 and 34 when the neck portion 30 is positioned vertically (door opened, horizontal position), but traps a small amount of rinse agent in the boot 80 to prevent air from flowing into either of the fluid passageways 32 and 34 when the neck portion 30 is positioned horizontally (door closed, vertical position). In this regard, since opening 82 must face upwardly when the neck portion 30 is horizontally positioned, a suitable indicator arrow 84 is formed on the uppermost surface of the retaining ring 52 of the indicator cap 24 (see FIG. 2). Alternatively, threads 70 and 72 may be configured to allow threaded engagement only upon proper orientation of the opening 82 of the boot 80.

As shown in FIG. 4, boot 80 may be integrally molded within the bottom 86 of the reservoir 25 without departing from the spirit and scope of this invention.

It is been realized that drainage of the cavity 42 when the fluid passageways 32 and 34 are positioned horizontally (corresponding to the dishwasher door being closed), can be prevented by dimensioning the fluid passageways 32 and 34 relative to the viscosity of conventional dishwasher rinse agents. Specifically, conventional dishwasher rinse agents have a viscosity at 25° centigrade of 100–200 Centipoise. Utilizing a dishwasher rinse agent of this viscosity, as shown in the following table, experiments were conducted to determine the maximum diameter of the fluid passageways 32 and 34 that would prevent drainage of the rinse agent from the cavity 42 when the indicator 24 is positioned horizontally.

| INDICATOR POSITIONED HORIZONTALLY (DISHWASHER DOOR CLOSED) | | | | | | | | |
|---|---|---|---|---|---|---|---|---|
| Diameter | Drainage Time (Hours) | | | | | | | |
| (Inches) | 1 | 2 | 3 | 4 | 5 | 6 | 7 | 8 |
| 0.250 | ** | | | | | | | |
| 0.141 | **** | **** | **** | **** | **** | **** | **** | **** |
| 0.125 | **** | **** | **** | **** | **** | **** | **** | **** |
| 0.106 | **** | **** | **** | **** | **** | **** | **** | **** |
| 0.086 | **** | **** | **** | **** | **** | **** | **** | **** |
| 0.067 | **** | **** | **** | **** | **** | **** | **** | **** |
| 0.046 | **** | **** | **** | **** | **** | **** | **** | **** |

From the foregoing table, it is readily seen that fluid passageway diameters less than 0.250 inches are required so that drainage of the cavity 42 does not occur for at least many hours when the indicator 24 is positioned horizontally, which corresponds to the dishwasher door being closed.

Similar to the foregoing, as shown in the following table, the fluid passageways 32 and 34 must have a minimum diameter that would allow drainage of the rinse agent from the cavity 42 when the indicator 24 is positioned vertically:

| INDICATOR POSITIONED VERTICALLY (DISHWASHER DOOR OPENED) | | | | | | | | |
|---|---|---|---|---|---|---|---|---|
| Diameter | Drainage Time (Hours) | | | | | | | |
| (Inches) | 1 | 2 | 3 | 4 | 5 | 6 | 7 | 8 |
| 0.250 | ** | | | | | | | |
| 0.141 | ** | | | | | | | |
| 0.125 | ** | | | | | | | |
| 0.106 | ** | | | | | | | |
| 0.086 | **** | **** | **** | **** | **** | **** | **** | **** |
| 0.067 | **** | **** | **** | **** | **** | **** | **** | **** |
| 0.046 | **** | **** | **** | **** | **** | **** | **** | **** |

Thus, it is readily seen that a passageway diameter of greater than 0.086 inches is required to permit drainage of the rinse agent from the cavity 42 when the indicator 24 is positioned vertically, corresponding to the dishwasher door being opened horizontally, so as to indicate a low level condition. Hence, the optimal range for the diameter of the fluid passageways is greater than 0.086 and less than 0.250 inches.

During testing, it is also been realized that, optimally, the second fluid passageway 34 should be approximately 0.060 inches longer than the first fluid passageway 32 and that the lumen of the passageways 32 and 34 should be spaced-apart by 0.050 inches. It has been further realized that a mini-cavity 130 should be formed at the uppermost end of the second fluid [drainage] passageway 34 so as to prevent bubbles rising from the first fluid [vent] passageway 32 from being siphoned down the drainage passageway 34 during the draining of the cavity 42 and interrupting the draining cycle. Finally, it has been found preferable to form the lower terminal end 36 of the second fluid passageway 34 with a radius cut and to flare the end of the second fluid passageway 34 to a 0.020 inch thickness between lumens (as opposed to 0.050 inch) so as to enhance the passage of an air bubble upwardly through the second fluid passageway 34 when the rinse agent fluid in the cavity 42 is in its low level condition.

In some dishwashers, the dishwasher rinse agent dispenser employs a sealed reservoir which would prevent the purging of air from the indicator 24 during charging. Other dishwasher rinse agent dispensers employ sealed reservoirs having air exchange tubes that may fill with rinse agent during charging of the indicator 24. In these types of dishwasher rinse agent dispensers, it is therefore desirable to allow the air within the cavity 42 of the indicator 24 to escape upon depressing of the pump mechanism 40 so that air within the cavity 42 is purged directly from the cavity 42 as opposed to through the fluid passageways 32 and 34 into the reservoir of the dishwasher rinse agent dispenser.

Figure 6A:
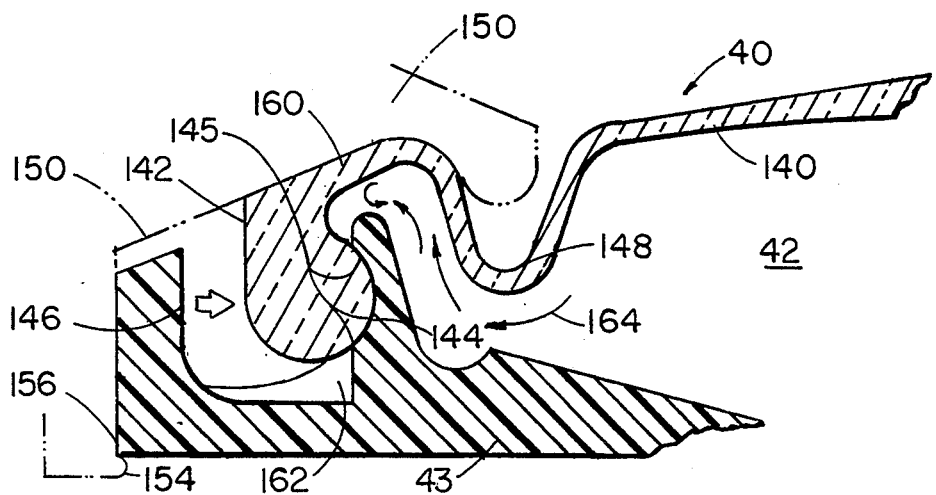
FIGS. 6A, 6B and 6C are partial cross-sectional views illustrating the fourth embodiment of the pump mechanism functioning as a one-way valve.
Figure 6B:
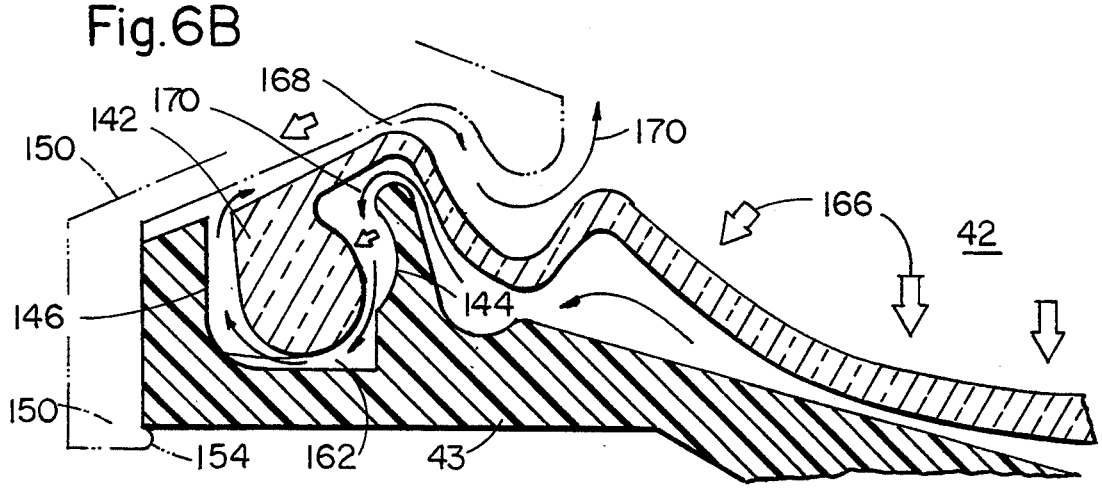
Figure 6C:
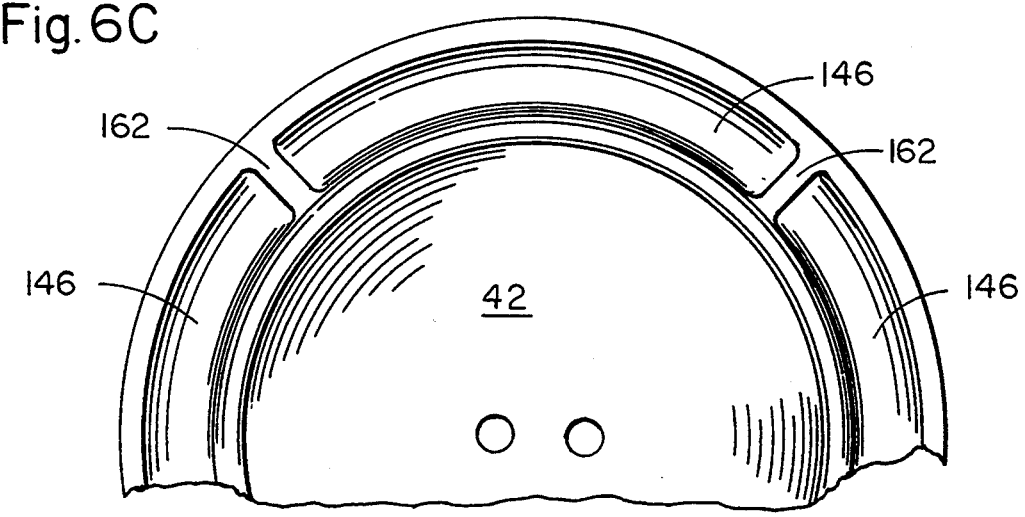

More particularly, referring to FIGS. 6A, 6B and 6C, a fourth embodiment of the pump mechanism 40 comprises a resilient translucent (or transparent) diaphragm 140 having a depending annular bead 142 formed about its outer annular periphery. Bead 142 is dimensioned and configured to sealingly fit into a corresponding seat 144 formed in the vertical wall of an annular slot 146 positioned about the outer periphery of the wall 43 defining the cavity 42. The diaphragm 140 includes an annular bellow 148 to enhance the resiliency of the diaphragm 140. The bead 142 of the diaphragm 140 is retained in its sealed position in the annular slot 146 by its inherent resiliency. An annular retaining ring 150 having depending leg 152 with inwardly extending lip 154 dimensioned such that the leg 152 is positioned about the outer periphery of the annular wall 43 defining the cavity 42 with the lip 154 removably engaged under the bottom corner 156 of the annular wall 43. The innermost annular edge 158 of the retaining ring 150 is angled downwardly to fit into the annular bellow 148 so as to impair the upper (outward) flexing of the resilient diaphragm 140.

The bottom surface 160 of the retaining ring 150 extends inwardly and upwardly so as to assist the inherent resiliency of the diaphragm 140 to force the bead 142 in a sealed position with the corresponding seat 144 as denoted by arrows 145. As shown in FIG. 6C, a plurality (e.g. 3 or 4) ramps 162 extend from the bottom of the slot 146 to urge the bead 142 upwardly to assure proper sealing with seat 144. Thus, an annular seal is formed and fluid within the cavity 42 is prevented from escaping, as noted by arrows 164.

As shown in FIG. 6B, upon downward flexing of the diaphragm 140 into the cavity 42 as shown by arrows 166, the angled bottom surface 168 of the retaining ring 150, coupled with ramps 162, urge the annular bead 142 to extend away from the annular seat 144 of the slot 146, thereby permitting fluid (e.g. air) within cavity 42 to flow around the annular bead 142, as shown by arrows 170. Thus, this embodiment of pump mechanism 40 functions as a one-way valve to allow purging of air contained within cavity 42 during charging of the indicator 24.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit of the invention. Now that the invention has been described,

What is claimed is:

1. A door for a dishwasher, the door being pivotal between an opened horizontal position and a vertical closed position, the door comprising in combination:
 - a dishwasher rinse agent dispenser including a reservoir with an opening;
 - an indicator cap for indicating a low level of rinse agent in said reservoir, said cap comprising
 - a body including a head portion having a cavity formed therein and a neck portion;
 - means for vertically mounting said body into said opening in said reservoir with said neck portion extending downwardly into a bottommost area of said reservoir;
 - a fluid passageway extending through said neck portion from an opened terminal end thereof to said cavity of said head portion; and
 - visual pump means for pumping rinse agent through said first fluid passageway into said cavity to visually indicate the presence of the rinse agent in said cavity,
 - whereby, air is allowed to flow upwardly through said first fluid passageway when the level of rinse agent in said reservoir is below said opened terminal end of said first fluid passageway causing drainage of rinse agent in said cavity to visually indicate a low level condition.

2. The door as set forth in claim 1, wherein said indicator cap further includes a second fluid passageway extending through said neck portion from an opened terminal end thereof to said cavity of said head portion, said opened terminal end of said second fluid passageway being positioned lower than said opened terminal end of said first fluid passageway.

3. The door as set forth in claim 2, wherein said pump means of said indicator cap comprises a resilient diaphragm positioned over said cavity whereby, upon depressing of said diaphragm, said diaphragm flexes inwardly to force air in said cavity outwardly through said first fluid passageway and, upon release, said resiliency of said diaphragm draws rinse agent through said first fluid passageway into said cavity to be visually observed.

4. The door as set forth in claim 3, wherein said indicator cap further includes a retaining ring positioned about said diaphragm to secure said diaphragm about said cavity.

5. The door as set forth in claim 4, wherein said fluid passageways of said indicator cap comprise a diameter greater than 0.086 inches.

6. The door as set forth in claim 4, wherein said fluid passageways of said indicator cap comprise a diameter less than 0.250 inches.

7. The door as set forth in claim 4, wherein said second fluid passageway extends approximately 0.060 inches lower than said first fluid passageway.

8. The door as set forth in claim 4, wherein said indicator cap further includes a mini cavity position at an uppermost end of said second fluid passageway.

9. The door as set forth in claim 4, wherein said indicator cap comprises means for one-way venting of air from said cavity upon depressing said diaphragm.

10. The door as set forth in claim 9, wherein said one-way vent means of said indicator cap comprises an annular bead formed about the periphery of said diaphragm which seals against a corresponding annular seat of said cavity and which, upon depressing of said diaphragm, said annular bead is moved away from said annular seat allowing air in said cavity to vent therefrom.

11. The door as set forth in claim 1, wherein said neck portion of said indicator cap is retractable such that said indicator cap is adaptable to different models of said rinse agent dispenser.

12. The door as set forth in claim 1, wherein said neck portion of said indicator cap is retractable to presettable positions such that said indicator cap is adaptable to different models of said rinse agent dispenser.

13. The door as set forth in claim 12, wherein said neck portion of said indicator cap is retractable to presettable positions by means of a lock arm extending from said head portion which engages into an indentation formed in said neck portion.

14. The door as set forth in claim 11, wherein said neck portion of said indicator cap is retractable by means of bellows between said neck portion and said head portion.

15. The door as set forth in claim 1, further including a gasket adaptor positioned about said neck portion such that said indicator cap is adaptable to different models of said rinse agent dispenser.

16. The door as set forth in claim 1, further including a gasket adaptor removably positioned about said neck portion such that said indicator cap is adaptable to different models of said rinse agent dispenser.

17. The door as set forth in claim 16, wherein said gasket adaptor comprises a gasket flange which forms a seal a lumen of said opening of said reservoir.

18. The door as set forth in claim 16, wherein said gasket adaptor comprises a gasket flange which forms a seal a corner of said opening of said reservoir.

19. A universal indicator cap for a dishwasher rinse agent dispenser including a reservoir with an opening positioned in door for a dishwasher for indicating a low level of rinse agent in the reservoir, the door being pivotal between an opened horizontal position and a vertical closed position, the indicator cap comprising in combination:
a body including a head portion having a cavity formed therein and a neck portion, said neck portion being retractable such that said indicator cap is adaptable to different models of the rinse agent dispenser;
means for vertically mounting said body into said opening in the reservoir with said neck portion extending downwardly into a bottommost area of the reservoir;
a first fluid passageway extending through said neck portion from an opened terminal end thereof to said cavity of said head portion; and
visual pump means for pumping rinse agent through said first fluid passageway into said cavity to visually indicate the presence of the rinse agent in said cavity,
whereby, air is allowed to flow upwardly through said first fluid passageway when the level of rinse agent in the reservoir is below said opened terminal end of said first fluid passageway causing drainage of rinse agent in said cavity to visually indicate a low level condition.

20. The indicator cap as set forth in claim 19, wherein said neck portion of said indicator cap is retractable to presettable positions such that said indicator cap is adaptable to different models of said rinse agent dispenser.

21. The indicator cap as set forth in claim 20, wherein said neck portion of said indicator cap is retractable to presettable positions by means of a lock arm extending from said head portion which engages into an indentation formed in said neck portion.

22. The indicator cap as set forth in claim 21, wherein said neck portion of said indicator cap is retractable by means of bellows between said neck portion and said head portion.

23. The indicator cap as set forth in claim 19, further including a gasket adaptor positioned about said neck portion such that said indicator cap is adaptable to different models of the rinse agent dispenser.

24. The indicator cap as set forth in claim 19, further including a gasket adaptor removably positioned about said neck portion such that said indicator cap is adaptable to different models of the rinse agent dispenser.

25. The indicator cap as set forth in claim 24, wherein said gasket adaptor comprises a gasket flange which forms a seal a lumen of said opening of said reservoir.

26. The indicator cap as set forth in claim 24, wherein said gasket adaptor comprises a gasket flange which forms a seal a corner of said opening of said reservoir.

27. A universal indicator cap for a dishwasher rinse agent dispenser including a reservoir with an opening positioned in door for a dishwasher for indicating a low level of rinse agent in the reservoir, the door being pivotal between an opened horizontal position and a vertical closed position, the indicator cap comprising in combination:
a body including a head portion having a cavity formed therein and a neck portion;
a gasket adaptor positioned about said neck portion such that said indicator cap is adaptable to different models of the rinse agent dispenser;
means for vertically mounting said body into said opening in the reservoir with said neck portion extending downwardly into a bottommost area of the reservoir;
a first fluid passageway extending through said neck portion from an opened terminal end thereof to said cavity of said head portion; and
visual pump means for pumping rinse agent through said first fluid passageway into said cavity to visually indicate the presence of the rinse agent in said cavity,
whereby, air is allowed to flow upwardly through said first fluid passageway when the level of rinse agent in the reservoir is below said opened terminal end of said first fluid passageway causing drainage of rinse agent in said cavity to visually indicate a low level condition.

28. The indicator cap as set forth in claim 27, wherein said gasket adaptor is removably positioned about said neck portion.

29. The indicator cap as set forth in claim 28, wherein said gasket adaptor comprises a gasket flange which forms a seal a lumen of said opening of said reservoir.

30. The indicator cap as set forth in claim 28, wherein said gasket adaptor comprises a gasket flange which forms a seal a corner of said opening of said reservoir.

31. The indicator cap as set forth in claim 27, wherein said neck portion of said indicator cap is retractable such that said indicator cap is adaptable to different models of said rinse agent dispenser.

32. The indicator cap as set forth in claim 31, wherein said neck portion of said indicator cap is retractable to presettable positions.

33. The indicator cap as set forth in claim 32, wherein said neck portion of said indicator cap is retractable to presettable positions by means of a lock arm extending from said head portion which engages into an indentation formed in said neck portion.

34. The indicator cap as set forth in claim 33, wherein said neck portion of said indicator cap is retractable by means of bellows between said neck portion and said head portion.

* * * * *